(12) United States Patent
Woo et al.

(10) Patent No.: US 12,454,785 B2
(45) Date of Patent: Oct. 28, 2025

(54) LAUNDRY TREATMENT APPARATUS

(71) Applicant: LG Electronics Inc., Seoul (KR)

(72) Inventors: Seyoung Woo, Seoul (KR); Joonho Pyo, Seoul (KR); Jeongyeon Park, Seoul (KR); Byungjae Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 17/562,600

(22) Filed: Dec. 27, 2021

(65) Prior Publication Data

US 2022/0205161 A1 Jun. 30, 2022

(30) Foreign Application Priority Data

Dec. 24, 2020 (KR) .................. 10-2020-0182849

(51) Int. Cl.
*D06F 37/40* (2006.01)
*D06F 37/06* (2006.01)
*D06F 39/12* (2006.01)

(52) U.S. Cl.
CPC .............. *D06F 37/40* (2013.01); *D06F 37/06* (2013.01); *D06F 39/12* (2013.01)

(58) Field of Classification Search
CPC .......... D06F 37/40; D06F 37/06; D06F 39/12; D06F 23/04; D06F 37/30; D06F 37/304;
(Continued)

(56) References Cited

U.S. PATENT DOCUMENTS 4,291,556 A * 9/1981 Mason .................... D06F 37/40
68/133
4,387,580 A * 6/1983 Kennedy ................. D06F 37/40
192/46
(Continued)

FOREIGN PATENT DOCUMENTS

CN 1536152 10/2004
CN 1780096 5/2006
(Continued)

OTHER PUBLICATIONS

JP-2002346284-A machine translation (Year: 2002).*
(Continued)

*Primary Examiner* — Michael E Barr
*Assistant Examiner* — Thomas Bucci
(74) *Attorney, Agent, or Firm* — Fish & Richardson P.C.

(57) ABSTRACT

A laundry treatment apparatus includes: a tub, a drum provided in the tub, an agitator provided in the drum, a driver coupled to the tub and providing power for rotating at least one of the drum or the agitator, and a clutch unit provided between the driver and the agitator and transmitting the power to at least one of the drum or the agitator. The clutch unit includes: a gear unit rotating based on being engaged with the driver, a rotary shaft coupled to the gear unit and rotating the agitator, a housing coupled to the drum and accommodating the gear unit and the rotary shaft, a coupler reciprocating between the housing and the driver and rotating the housing, a moving unit including the coupler therein to reciprocate the coupler, and an actuator reciprocating the moving unit, where at least a portion of the actuator is disposed in the driver.

20 Claims, 16 Drawing Sheets

(58) Field of Classification Search
CPC ........... Y02B 40/00; F16D 11/14; H02K 1/12;
H02K 1/22; H02K 7/003; H02K 7/108;
H02K 7/116; H02K 11/20
USPC ........................................................ 68/12.27
See application file for complete search history.

(56) References Cited

U.S. PATENT DOCUMENTS

| | | | | |
|---|---|---|---|---|
| 4,430,871 A * | 2/1984 | Brenner | .................. | D06F 37/40 68/23.7 |
| 4,566,295 A * | 1/1986 | Mason | .................... | F16D 11/16 68/12.01 |
| 5,860,299 A * | 1/1999 | Eum | ........................ | D06F 37/40 68/133 |
| 6,049,930 A * | 4/2000 | Hisano | .................... | D06F 37/40 68/12.02 |
| 6,176,108 B1 * | 1/2001 | Bae | ........................ | D06F 37/40 68/23.7 |
| 6,332,343 B1 * | 12/2001 | Koketsu | ................ | D06F 37/304 68/12.02 |
| 10,662,569 B2 * | 5/2020 | Jang | ........................ | H02K 5/10 |
| 11,332,872 B2 * | 5/2022 | Yoneda | .................. | D06F 37/304 |
| 2003/0000263 A1 * | 1/2003 | Kim | ........................ | D06F 37/40 68/23.7 |
| 2003/0177794 A1 * | 9/2003 | Yoon | ........................ | D06F 37/40 68/12.02 |
| 2004/0168485 A1 * | 9/2004 | Lim | ........................ | D06F 37/36 68/24 |
| 2005/0081573 A1 * | 4/2005 | Han | ...................... | D06F 37/304 68/132 |
| 2005/0166643 A1 * | 8/2005 | Cho | ........................ | D06F 37/40 68/132 |
| 2008/0216521 A1 * | 9/2008 | Sanchez Dominguez | .................. | F16D 11/10 68/23.7 |
| 2010/0175437 A1 * | 7/2010 | Kim | ........................ | D06F 23/04 68/23 R |
| 2011/0023239 A1 | 2/2011 | Lee et al. | | |
| 2012/0137738 A1 * | 6/2012 | Lee | ........................ | D06F 37/40 68/12.24 |
| 2013/0139557 A1 * | 6/2013 | Chen | ...................... | D06F 37/40 68/131 |
| 2013/0199247 A1 * | 8/2013 | Lee | ........................ | D06F 37/40 68/131 |
| 2013/0205512 A1 * | 8/2013 | Chupka | .................. | D06F 37/40 68/12.24 |
| 2016/0168775 A1 * | 6/2016 | Kim | ........................ | H02K 16/02 310/90 |
| 2016/0376741 A1 * | 12/2016 | Kim | ........................ | D06F 37/206 310/90 |
| 2017/0241063 A1 * | 8/2017 | Kim | ........................ | D06F 37/40 |
| 2017/0241486 A1 * | 8/2017 | Pritchard | ................ | F16D 23/14 |
| 2017/0260679 A1 * | 9/2017 | Carr | ...................... | D06F 37/304 |
| 2019/0226137 A1 * | 7/2019 | Aruga | .................... | F16D 11/14 |
| 2019/0226573 A1 * | 7/2019 | Aruga | .................... | D06F 37/40 |
| 2019/0264369 A1 * | 8/2019 | Chun | .................... | D06F 37/304 |
| 2020/0332454 A1 * | 10/2020 | Oshima | .................. | D06F 37/40 |

FOREIGN PATENT DOCUMENTS

| | | |
|---|---|---|
| CN | 109837702 | 6/2019 |
| CN | 110088377 | 8/2019 |
| CN | 111406135 | 7/2020 |
| JP | 2002346284 A * | 12/2002 |
| KR | 20020058548 | 7/2002 |
| KR | 20110012787 | 2/2011 |
| KR | 20190124937 | 11/2019 |
| KR | 20200082340 | 7/2020 |
| WO | WO 2012/074269 | 6/2012 |
| WO | WO2019/107985 | 6/2019 |

OTHER PUBLICATIONS

Office Action in Chinese Appln. No. 202111598558.0, mailed on Apr. 21, 2023, 20 pages (with English translation).

Notice of Allowance in Australian Appln. No. 2021290396, mailed on Feb. 22, 2024, 3 pages.

* cited by examiner

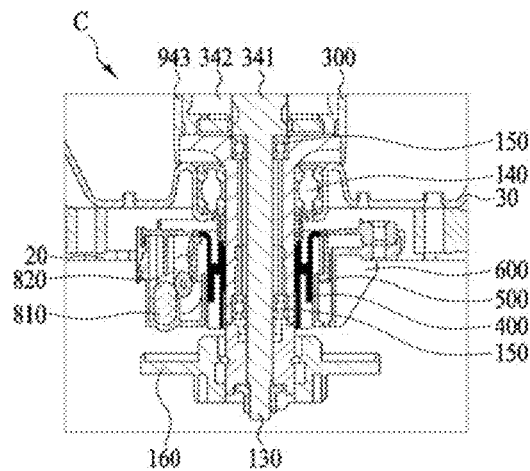
FIG. 6A
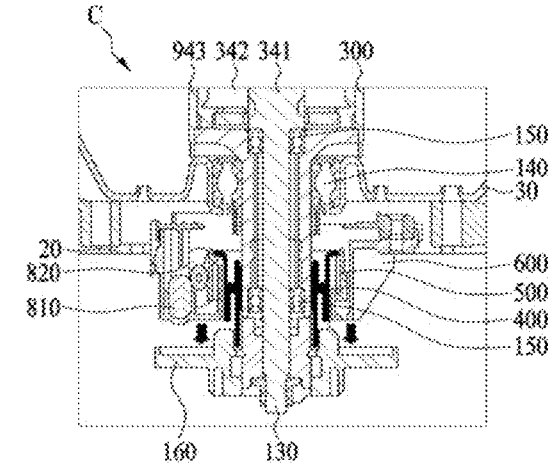
FIG. 6B
FIG. 7
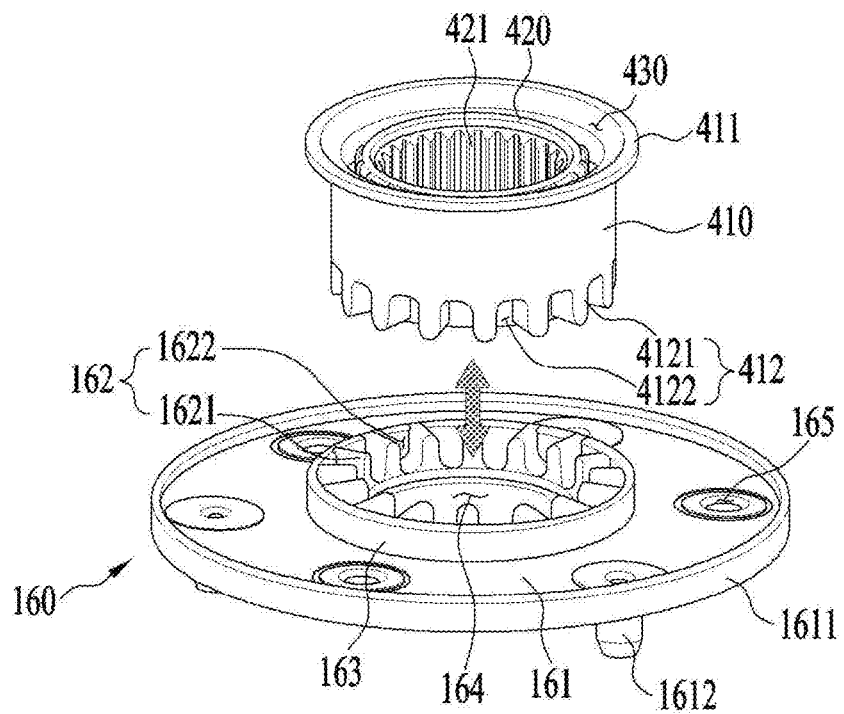

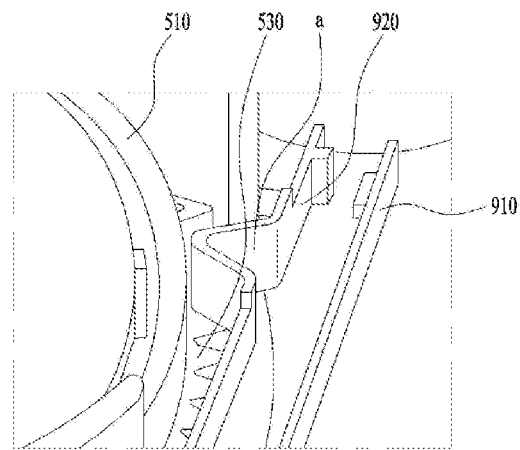
FIG. 13A
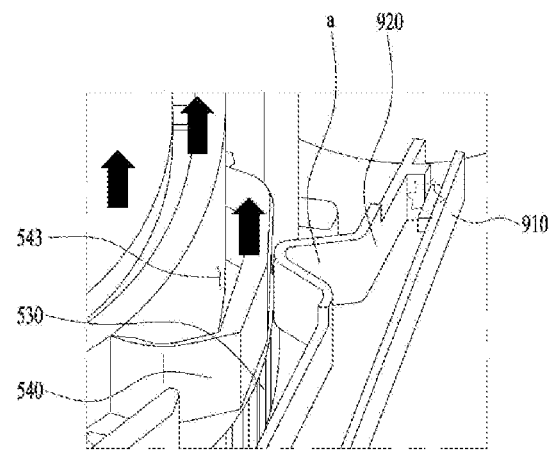
FIG. 13B
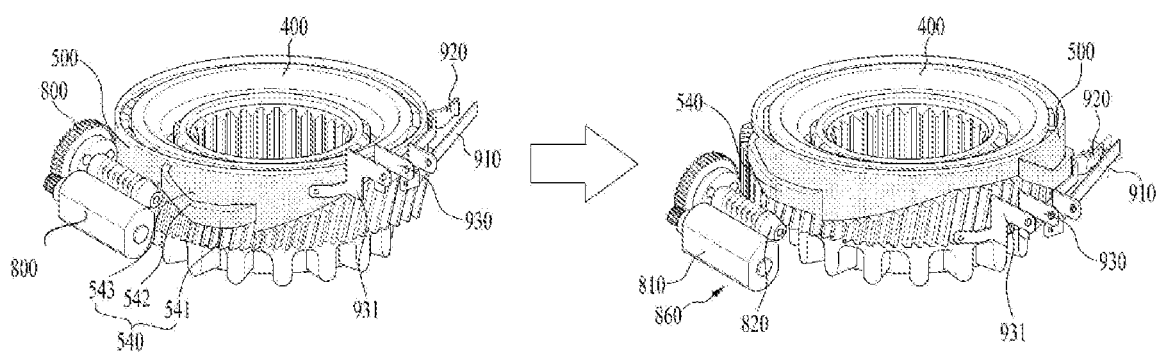
FIG. 14A
FIG. 14B

FIG. 16
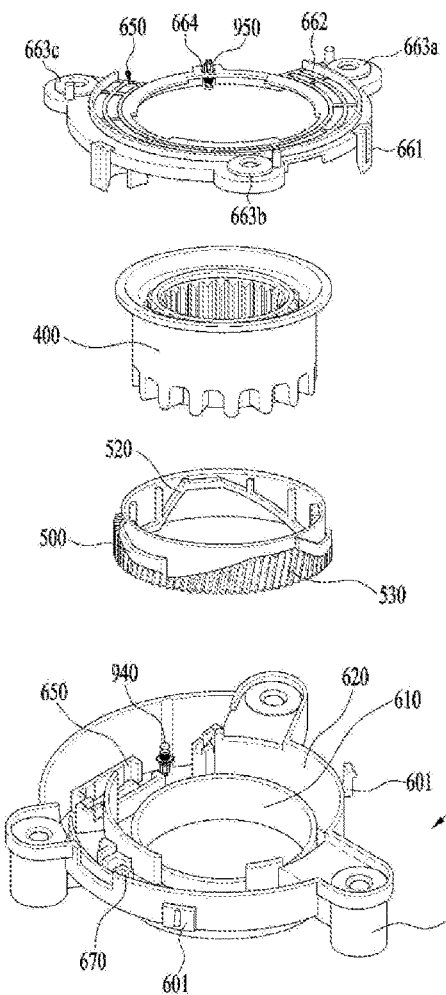
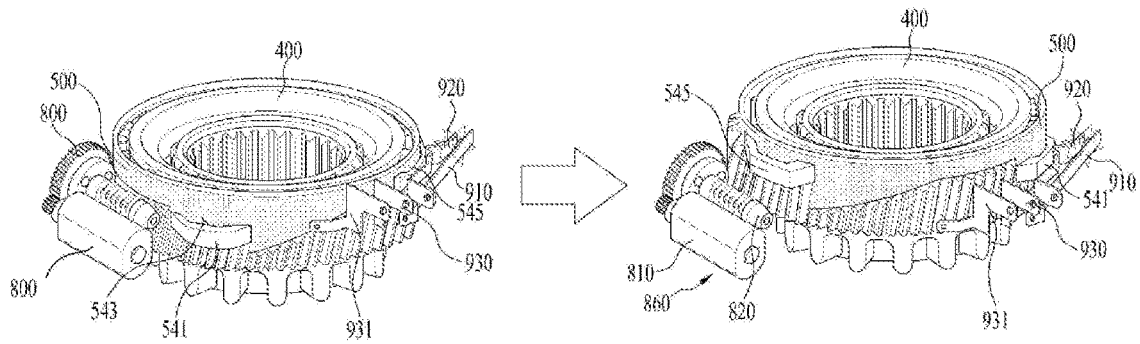
FIG. 17A                               FIG. 17B

LAUNDRY TREATMENT APPARATUS

CROSS-REFERENCE TO RELATED APPLICATION

This application claims the benefit of Korean Patent Application No. 10-2020-0182849, filed on Dec. 24, 2020, the disclosure of which is incorporated by reference in its entirety.

TECHNICAL FIELD

The present disclosure relates to a laundry treatment apparatus, and more particularly to a laundry treatment apparatus including a clutch member capable of separately or simultaneously rotating a drum and an agitator.

BACKGROUND

Generally, a laundry treatment apparatus may refer to an apparatus for washing laundry (e.g., a laundry object, a drying object, etc.), an apparatus for drying wet or washed laundry, and/or an apparatus for performing washing and drying of laundry.

Conventional laundry treatment apparatuses can be classified into a front-loading type laundry treatment device in which laundry is put into a tub through an inlet provided at a front surface of the front-loading type laundry treatment device, and a top-loading type laundry treatment device in which laundry is put into a tub through an inlet provided at a top surface of the top-loading type laundry treatment device.

In some examples, the top-loading type laundry treatment device can include a drum that rotates upon receiving laundry, and an agitator that rotates independently from the drum to improve washing performance. The agitator can define a bottom surface of the drum, and can protrude upward from the bottom surface of the drum, thereby providing a water stream independently from the drum.

The conventional laundry treatment apparatus can control the rotation direction of the drum and the agitator by arranging a clutch in a driver that provides power required to rotate the drum and the agitator.

FIG. 1 is a schematic diagram illustrating a driver structure of a conventional laundry treatment apparatus.

Referring to FIG. 1, the conventional laundry treatment apparatus can include a driver that is fixed to a lower portion of a tub 5 storing water to generate a rotating magnetic field. The driver can include a stator 71 to generate a rotating magnetic field, a rotor 72 rotated by the stator 71, and a drive shaft 73 to rotate by coupling to the rotor 72.

The rotor 72 can accommodate the outer circumferential surface of the stator 71, and the drive shaft 73 can extend toward the drum disposed in the tub 5.

The conventional laundry treatment apparatus can further include a clutch unit capable of transferring power generated by the drive shaft 73 to the drum and the agitator that rotates independently from the bottom surface of the drum. The clutch unit can include a gearbox 74 provided to be engaged with the drive shaft 73 and a rotary shaft 75 extending from the gearbox 74 to rotate the agitator. Thus, when the drive shaft 73 rotates, the gearbox 74 and the rotary shaft 75 rotate, so that the agitator can rotate.

In some examples, the clutch unit can further include a housing 5 in which the gearbox 74 is disposed. The housing 5 can include the gearbox 74, the rotary shaft 75, and the drive shaft 73 to be rotated therein, and can be coupled to the drum. As a result, the housing 5 can rotate independently of the drive shaft 73, and the drum can rotate independently of the agitator.

The clutch unit can further include a coupler 4 for enabling the housing 5 to be selectively coupled to the driver.

The coupler 4 can selectively couple the housing 5 to the rotor 72, and can thus transmit rotational force of the rotor 72 to the housing 5.

The coupler 4 can be coupled to the housing 5, so that the coupler 4 can descend toward the rotor 72 or can ascend to be spaced apart from the rotor 72.

When the coupler 4 descends to couple the housing 5 to the rotor 72, the housing 5 and the drum can rotate together with the rotor 72 due to rotation of the rotor 72. When the coupler 4 ascends to separate the housing 5 and the rotor 72 from each other, only the agitator may rotate, or the drum may rotate in the opposite direction to the agitator according to the structure of the gearbox 74.

In order to control the coupler 4, the conventional laundry treatment apparatus can include an actuator 2 for providing power to move the coupler 4, and a moving unit 3 for moving the coupler 4 with power generated by the actuator 2.

The moving unit 3 can support the coupler 4, and the actuator 2 can further include intermediary units 21 and 22 capable of directly moving the moving unit 3. As a result, the conventional laundry treatment apparatus may move the moving unit 3 by driving the actuator 2, so that the coupler 4 can ascend.

Generally, the actuator 2 can include a motor for generating rotational force and the like. Therefore, the intermediary units 21 and 22 for use in the conventional laundry treatment apparatus may be provided with various structures capable of converting the rotational energy generated by the actuator 2 into a rectilinear reciprocating motion capable of elevating the moving unit 3.

For example, the intermediary units 21 and 22 may be classified into a horizontal moving unit 21 to reciprocate in a horizontal direction by rotation of the actuator 2, and a vertical moving unit 22 capable of converting reciprocating motion of the horizontal moving unit 21 into vertical (or perpendicular) reciprocating motion of the horizontal moving unit 21.

The intermediary units can be provided to convert the rotational motion generated by the actuator 2 into rectilinear reciprocating motion. In order to expand the rotational motion generated by the actuator into vertical motion having a sufficient length, it is necessary for each of the intermediary units to have at least a predetermined length. This is because, as the intermediary units become longer in length, the width in position change of the end of each intermediary unit becomes longer.

Accordingly, in order to secure the length of the intermediary units, the conventional laundry treatment apparatus has disadvantages in that the actuator 2 should be located farther than the driver.

In other words, the conventional laundry treatment apparatus may be configured such that the actuator 2 is separately disposed in an outer region D2 located outside the entire diameter D1 of the driver, so that the conventional laundry treatment apparatus should secure a predetermined displacement through which the intermediary units 21 and 22 can sufficiently move the coupler 4.

Therefore, in order for the actuator 2 to move the coupler 4, the actuator 2 should be disposed farther from the coupler 4.

In addition to the volume occupied by the driver, a volume to be occupied by the actuator 2 and the intermediary units 21 and 22 is separately needed, so that the volume required for installation of constituent components can be further expanded regardless of a washing volume.

Accordingly, in order to secure a space for installation of the intermediary units 21 and 22 and the actuator 2, the conventional laundry treatment apparatus has a limitation in compact installation of the driver and the clutch unit, and cannot secure a sufficient washing capacity.

Since the actuator 2 is disposed outside the driver, the conventional laundry treatment apparatus has difficulty in installing the driver and the actuator 2 separately or independently from each other.

Since the operation of installing the coupler 4, the actuator 2, and the intermediary units 21 and 22 is complicated, the installation process of the clutch is complicated and insufficient.

In addition, the conventional laundry treatment apparatus has a limitation in that an additional structure is required to block interference between the driver and the intermediary units 21 and 22.

In addition, the conventional laundry treatment apparatus requires an additional process in which, after the driver is assembled with the tub, the actuator 2 and the intermediary units 21 and 22 should be assembled or installed in the driver.

Also, the actuator 2 is separately disposed outside the driver, so that a separate control line for controlling the actuator 2 should be separately disposed or fixed outside the driver, resulting in inconvenience of use.

In addition, the conventional laundry treatment apparatus is configured such that the coupler 4 and the actuator 2 are spaced apart from each other, and has disadvantages in that the intermediary units 21 and 22 for connecting the coupler 4 to the actuator 2 cannot be omitted.

Therefore, since the actuator 2 does not directly move the coupler 4, the reliability of controlling the coupler 4 is reduced.

Furthermore, the conventional laundry treatment apparatus has difficulty in transferring power generated by the actuator 2 to the coupler 4 without change in the power. Specifically, the actuator 2 has no choice but to rotate the intermediary units 21 and 22 at a predetermined angle level, so that it is impossible to utilize the overall output of the actuator 2.

In addition, since the conventional laundry treatment apparatus enables the actuator 2 to rotate within a predetermined angle range, the sensor unit is provided to detect the angle of the actuator 2 or the angle of the intermediary units 21 and 22.

Therefore, the conventional laundry treatment apparatus indirectly recognizes the position of the coupler 4 through the actuator 2, reducing accuracy in correctly recognizing the position. In addition, the controller or the like of the laundry treatment apparatus has no choice but to indirectly determine whether the coupler 4 and the intermediary unit operate normally through the actuator 2.

In particular, the conventional laundry treatment apparatus requires the sensor unit to be in contact with the actuator 2 or the intermediary units 21 and 22, so that the conventional laundry treatment apparatus has disadvantages in that the overall volume of the actuator 2 and the intermediary units 21 and 22 should be further expanded.

Therefore, in the conventional laundry treatment apparatus, the actuator 2 cannot be installed in the driver.

SUMMARY

The present disclosure is directed to a laundry treatment apparatus that allows an actuator driving a clutch to be installed using a space occupied by a driver.

The present disclosure is also directed to a laundry treatment apparatus in which the actuator is installed in a driver or is installed in an overlapping manner with the driver.

The present disclosure is also directed to a laundry treatment apparatus capable of securing a washing volume by reducing a space occupied by the actuator separately from the driver.

The present disclosure is also directed to a laundry treatment apparatus in which the actuator and the driver that are used to drive the clutch are modularized and installed.

The present disclosure is also directed to a laundry treatment apparatus in which rotational energy generated by the actuator driving the clutch can be transmitted to the clutch without being converted into rectilinear motion or reciprocating rotational motion.

According to one aspect of the subject matter described in this application, a laundry treatment apparatus can include a tub configured to receive water, a drum that is rotatably provided in the tub and that is configured to receive laundry, an agitator that is rotatably provided in the drum and that is configured to move the laundry, a driver that is coupled to the tub and that is configured to provide power for rotating at least one of the drum or the agitator, and a clutch unit that is provided between the driver and the agitator and that is configured to transmit the power from the driver to at least one of the drum or the agitator. The clutch unit can include a gear unit configured to rotate based on being engaged with the driver, a rotary shaft that is coupled to the gear unit and that is configured to rotate the agitator, a housing that is coupled to the drum and that accommodates the gear unit and the rotary shaft, a coupler that is configured to reciprocate between the housing and the driver and that is configured to rotate the housing, a moving unit that includes the coupler therein to reciprocate the coupler, and an actuator configured to reciprocate the moving unit, where at least a portion of the actuator is disposed in the driver.

Implementations according to this aspect can include one or more of the following features. For example, at least a portion of the actuator can overlap the driver in a direction of the rotary shaft.

In some implementations, the driver can include a stator that is coupled to the tub and that is configured to generate a rotating magnetic field, a rotor configured to be rotated by the stator, and a drive shaft configured to rotate with the rotor so as to rotate the gear unit. At least a portion of the actuator can be disposed in the stator. In some examples, the stator can include a core coupled to the tub and through which the drive shaft passes, and a fixing rib that radially extends from an outer circumferential surface of the core and that has a coil wound thereon. At least a portion of the actuator can be disposed in the core.

In some implementations, the laundry treatment apparatus can further include a sensor unit configured to determine whether the coupler or the moving unit is elevated, where the sensor unit is disposed in the driver. In some examples, the driver can include a stator that is coupled to the tub and that is configured to generate a rotating magnetic field, a rotor configured to be rotated by the stator, and a drive shaft configured to rotate with the rotor so as to rotate the gear unit. At least a portion of the sensor unit can be disposed in the stator.

In some examples, the stator can include a core coupled to the tub and through which the drive shaft to passes, and a fixing rib that radially extends from an outer circumferential surface of the core and that has a coil wound thereon. The sensor unit can be disposed in the core. In some examples, the moving unit or the coupler can be disposed in the core, and the sensor unit can be configured to sense a position or height of either the moving unit or the coupler.

In some examples, the sensor unit can be disposed to be spaced apart from the actuator. In some implementations, the laundry treatment apparatus can further include a case that is disposed in the driver and that accommodates the moving unit to be reciprocated. The actuator can be disposed in the case. In examples, the case can include a receiving body that is disposed in the driver and that accommodates the moving unit or the coupler, and a first installation unit that is disposed at an outside of the receiving body and that is coupled to the actuator.

In some implementations, the laundry treatment apparatus can further include a sensor unit configured to sense whether the coupler or the moving unit is elevated. The case can further include a second installation unit that is disposed at an outside of the receiving body and that accommodates the sensor unit. In some examples, the first installation unit and the second installation unit can be spaced apart from each other. In some examples, the driver can include a stator that is coupled to the tub and that is configured to generate a rotating magnetic field, a rotor configured to be rotated by the stator, and a drive shaft configured to rotate together with the rotor so as to rotate the gear unit. The receiving body, the first installation unit, and the second installation unit can be disposed in the stator.

In some implementations, the stator can include a core coupled to the tub and through which the drive shaft passes, and a fixing rib that radially extends from an outer circumferential surface of the core and that has a coil wound thereon. The receiving body, the first installation unit, and the second installation unit can be disposed in the core. In some implementations, the case can include a plurality of coupling units that extend from the receiving body toward an inner circumferential surface of the core and that couples the receiving body to an inside of the core. The first installation unit and the second installation unit can be disposed between an inner circumferential surface of the core and the plurality of coupling units.

In some examples, the plurality of coupling units can include a first coupling unit extending from the receiving body toward the inner circumferential surface of the core, a second coupling unit that is spaced apart from the first coupling unit within the receiving body and that extends to the inner circumferential surface of the core, and a third coupling unit that is spaced apart from the first coupling unit and the second coupling unit within the receiving body and that extends to the inner circumferential surface of the core. The first installation unit and the second installation unit can be disposed between the first coupling unit and the second coupling unit. In some examples, the plurality of coupling units can include a first coupling unit extending from the receiving body toward the inner circumferential surface of the core, a second coupling unit that is spaced apart from the first coupling unit within the receiving body and that extends to the inner circumferential surface of the core, and a third coupling unit that is spaced apart from the first coupling unit and the second coupling unit within the receiving body and that extends to the inner circumferential surface of the core. The first installation unit can be disposed between the first coupling unit and the second coupling unit, and the second installation unit can be disposed between the second coupling unit and the third coupling unit.

In some implementations, the plurality of coupling units can include a first coupling unit extending from the receiving body toward the inner circumferential surface of the core, a second coupling unit that is spaced apart from the first coupling unit within the receiving body and that extends to the inner circumferential surface of the core, and a third coupling unit that is spaced apart from the first coupling unit and the second coupling unit within the receiving body and that extends to the inner circumferential surface of the core. At least one of regions defined among the first coupling unit, the second coupling unit, the third coupling unit, and the inner circumferential surface of the core can provide an opening that is configured move air therein. In some implementations, the actuator can be configured to rotate the moving unit by one or more revolutions and in a first direction.

BRIEF DESCRIPTION OF THE DRAWINGS

FIGS. 6A and 6B are diagrams of the operation principles of the exemplary clutch unit (C).

FIG. 7 is a diagram illustrating a structure of a clutch of an exemplary laundry treatment apparatus.

FIGS. 13A and 13B are diagrams illustrating an exemplary sensor unit.

FIGS. 14A and 14B are diagrams illustrating an exemplary coupling structure when the coupler ascends according to elevation of the moving unit.

FIG. 16 is a diagram illustrating another exemplary sensor unit of the laundry treatment apparatus.

FIGS. 17A and 17B are diagrams illustrating another exemplary sensor unit of the laundry treatment apparatus.

DETAILED DESCRIPTION

Figure 1:
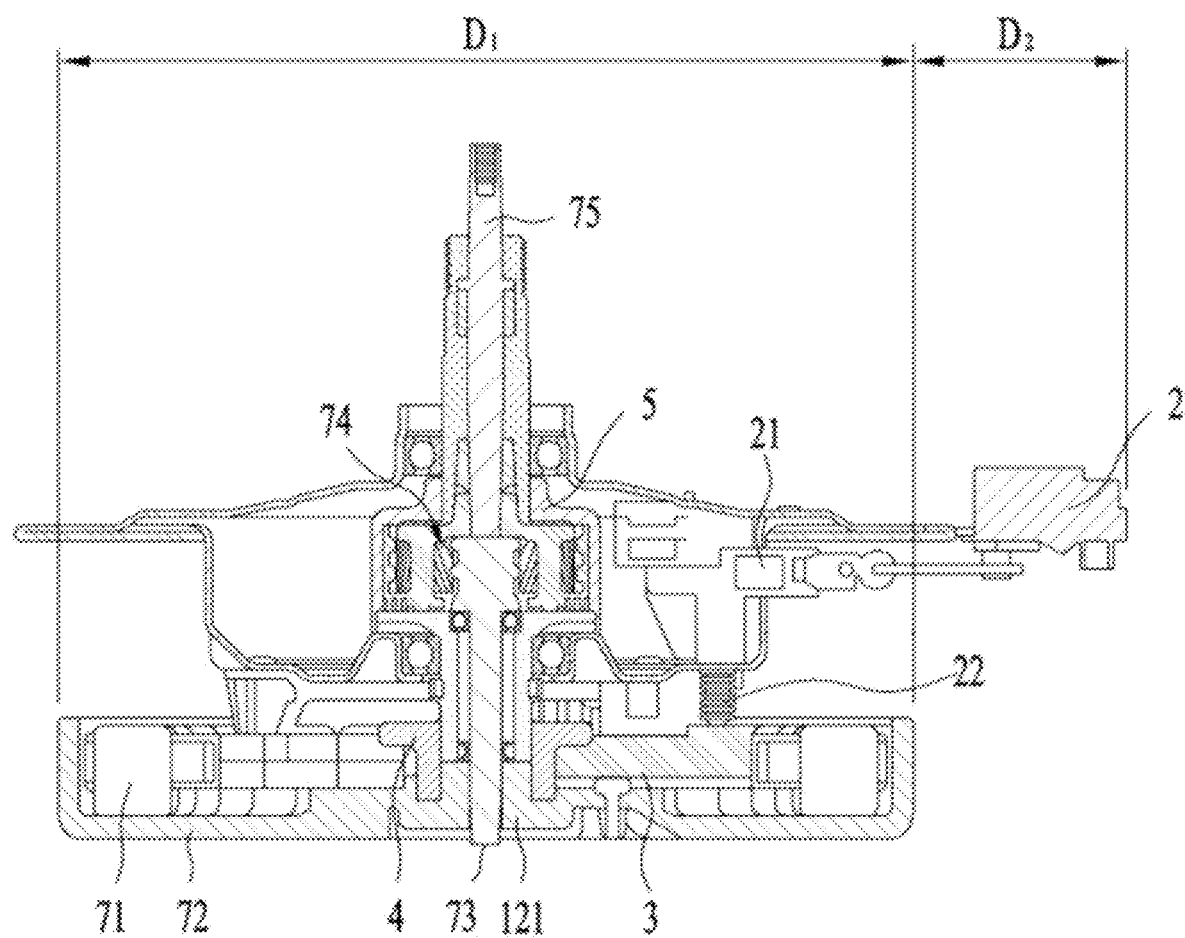
FIG. 1 is a schematic diagram illustrating a clutch structure of a conventional laundry treatment apparatus.
Figure 2:
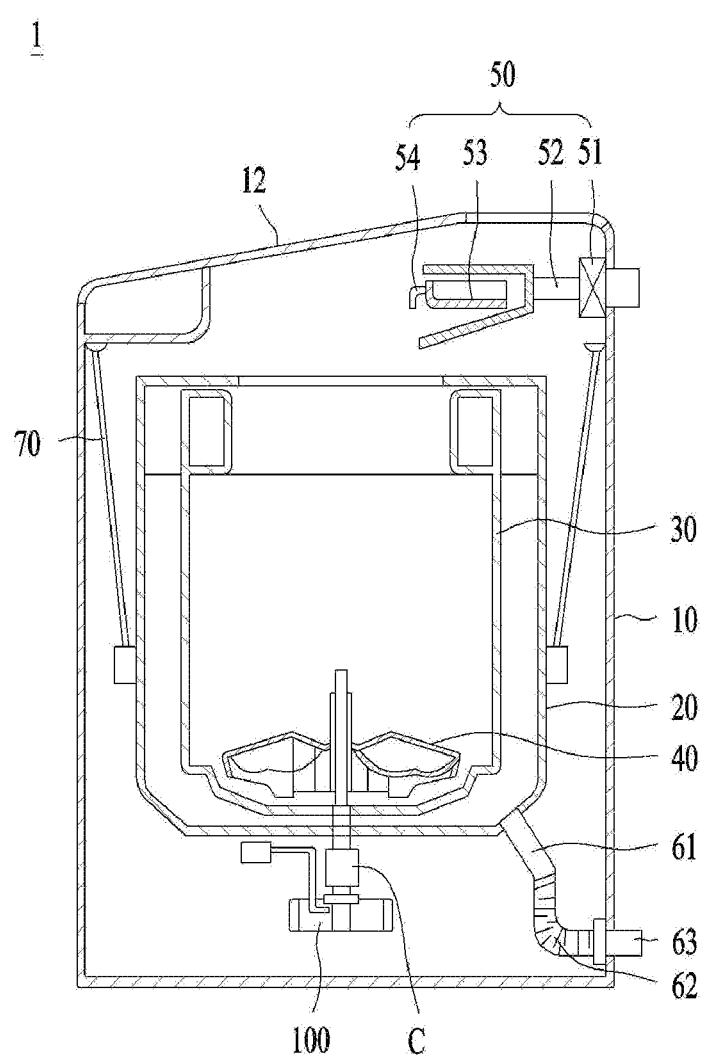
FIG. 2 is a diagram illustrating an exemplary laundry treatment apparatus.

FIG. 2 is a diagram illustrating an exemplary laundry treatment apparatus.

Referring to FIG. 2, the laundry treatment apparatus can include a cabinet 10 defining an external appearance of the laundry treatment apparatus, a tub 20 that is provided in the cabinet 10 and that is configured to store water, a drum 30 that is rotatably provided in the tub 20 and that is configured to accommodate laundry, a water supply unit 50 that is configured to supply water to the tub 20, and a drain unit that is configured to discharge water from the tub 20 to the outside of the cabinet 10.

The cabinet 10 can include an inlet 12 provided at an upper portion of the cabinet 10 such that laundry is put into the tub through the inlet 12, and a door to open or close the inlet 12.

The cabinet 10 can include a control panel for receiving a command required to drive the laundry treatment apparatus. The control panel can include a controller that is configured to control at least one of a driver 100 or a clutch (C). In some implementations, the control panel can be connected to the control panel and the controller.

The water supply unit 50 can include a water supply valve 51 that is coupled to the cabinet 10 and that is configured to receive water from an external water supply source, a water supply pipe 52 that extends from the water supply valve 51 and that is configured to receive water, a detergent box 53 communicating with the water supply pipe 52 to receive detergent, and a water supply pipe 54 that extends from the detergent box 53 and that is configured to supply water to the tub 20. The detergent box 53 can be provided in the cabinet 10, or can be provided in front of the cabinet 10.

The drain unit can include a discharge pipe 61 communicating with a lower portion of the tub 20 to discharge water from the tub 20, a drain pump 62 communicating with the discharge pipe 61 to discharge water to the outside of the cabinet 10, and a drain pipe 63 extending from the drain pump 62 to the outside of the cabinet 10.

The laundry treatment apparatus can further include a suspension 70 for fixing the tub 20 to the inside of the cabinet 10. The suspension 70 can include a support bar for coupling one side of the tub 20 to one surface of the cabinet 10, and a damper or spring coupled to the support bar to attenuate vibration.

The laundry treatment apparatus can further include an agitator 40 that is rotatably provided in the drum 30 and that is configured to agitate and move laundry or to provide a water stream. The agitator 40 can be rotatably provided at the bottom surface of the drum 30, and can protrude to a predetermined height toward the inlet 12.

The laundry treatment apparatus can further include a driver 100 coupled to the tub 20 to provide power for rotating the agitator 40 and the drum 30, and a clutch unit (C) coupled to the driver 100 to transmit the power to at least one of the agitator 40 or the drum 30.

The clutch unit (C) can be disposed between the driver 100 and the agitator 40 to selectively transmit the power of the driver 100 to at least one of the agitator 40 or the drum 30.

The clutch unit (C) can transmit the rotational force generated by the driver 100 to both the drum 30 and the agitator 40, or can transmit the rotational force generated by the driver 100 to any one of the drum 30 or the agitator 40.

The laundry treatment apparatus can determine whether to rotate both or any one of the drum 30 or the agitator 40 through control of the clutch unit (C).

For example, during a washing process, the laundry treatment apparatus can allow the drum 30 and the agitator 40 to rotate in opposite directions through the clutch unit (C), or can rotate only the agitator 40 through the clutch unit (C).

In addition, during a dehydration process, the laundry treatment apparatus can enable the drum 30 and the agitator 40 to rotate integrally and together through the clutch unit (C).

Figure 3A:
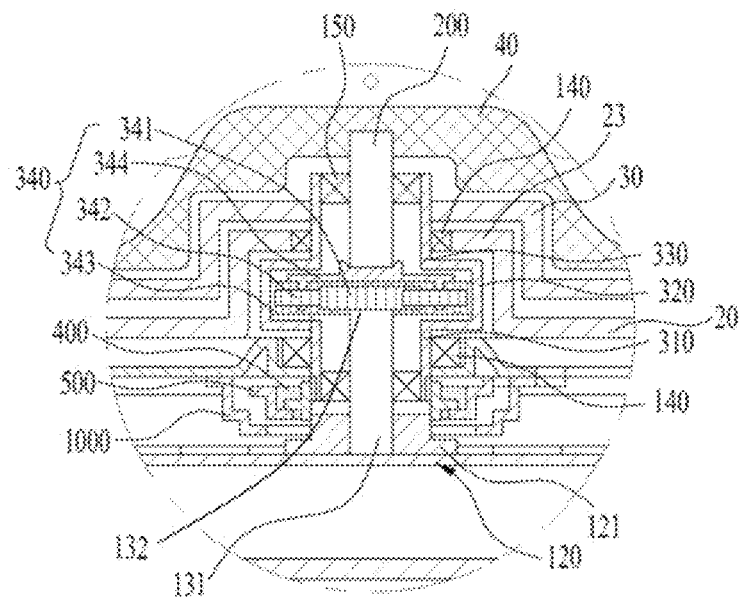
FIGS. 3A and 3B are diagrams illustrating the operation principles of a driver and a clutch unit of the exemplary laundry treatment apparatus.
Figure 3B:
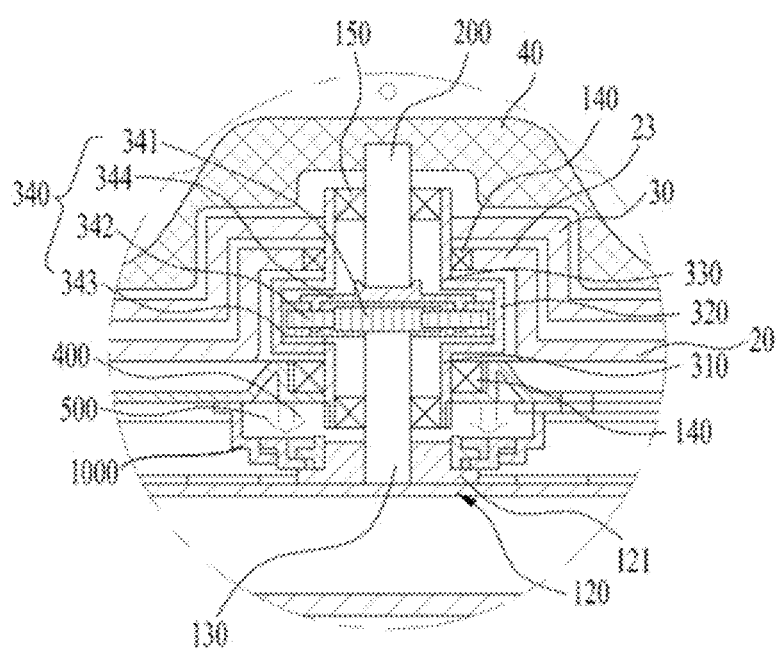

FIGS. 3A and 3B is are diagrams illustrating the operation principles of the driver and the clutch unit of the exemplary laundry treatment apparatus.

Referring to FIG. 3A, the driver 100 of the laundry treatment apparatus can include a stator 110 (see FIG. 4) that is provided under the tub 20 and that is configured to generate a rotating magnetic field, a rotor 120 rotated by the stator 110, and a drive shaft 130 configured to rotate by coupling to the rotor 120.

The rotor 120 can include a magnetic unit for generating rotational force by the rotating magnetic field generated by the stator 110, a rotor body 122 coupled to the magnetic unit or extending from the magnetic unit, and a seating unit 121 provided at the center of the rotor body 122 so that the drive shaft 130 is fixed or coupled thereto.

The seating unit 121 can include a bushing unit 160 for connecting the rotor 120 to the drive shaft 130.

The magnetic unit can include a permanent magnet or similar components.

The clutch unit (C) of the laundry treatment apparatus can include a housing 300 provided with a gear unit that rotates while being engaged with the driver 100 (see FIGS. 6A and 6B), a coupler 400 to rotate the housing 300 by selectively connecting the housing 300 and the driver 100, and a moving unit 500 to move the coupler 400 such that the driver 100 and the housing 300 can be detachably coupled to each other.

In addition, the clutch unit (C) can further include a cover unit 1000 coupled to the bottom surface of the tub 20 so that the cover unit 1000 can receive and protect the housing 300, the moving unit 500, and the intermediary unit.

The drive shaft 130 can include a shaft body 131 rotatably disposed in the housing 300, a first end portion provided at an upper end of the shaft body 131 and coupled to the gear unit 340, and a second end portion provided at a lower end of the shaft body 131 and coupled to the rotor 120.

The shaft body 131 can be longer than the housing 300, and the second end portion can be exposed outside the housing 300.

The housing 300 can include a guide housing 310 rotatably accommodating the drive shaft 130, a gear housing 320 extending from the guide housing 310 to accommodate the gear unit 340, and a rotary housing 330 extending from the gear housing 320 to accommodate the rotary shaft 200.

The guide housing 310 can be larger in size than the diameter of the drive shaft 130 so that the drive shaft 130 can freely rotate therein. The rotary housing 330 can also be larger in size than the diameter of the rotary shaft 200 so that the rotary shaft 200 can freely rotate therein. As a result, the guide housing 310 may not rotate with the drive shaft 130 even when the drive shaft 130 rotates, and the rotary housing 330 may not rotate with the rotary shaft 200 even when the rotary shaft 200 rotates.

As a result, the housing 300 can rotate independently of the rotary shaft 200 and the drive shaft 130. Therefore, when the drum 30 is coupled to the housing 300, the drum 30 may not be affected by rotation of the rotary shaft 200 and the drive shaft 130.

In some implementations, in order to accommodate the gear unit 340, the width of the gear housing 320 can be larger than the diameter of each of the rotary housing 330 and the guide housing 310.

Accordingly, when the gear housing 320 is supported by the bottom surface of the tub 20 or the bearing housing 26 of the tub 20, the entire housing 300 can be stably disposed below the tub 20.

Since the guide housing 310 is disposed below the gear housing 320 to accommodate the drive shaft 130, the drum 30 can be coupled to the rotary housing 330.

A bottom surface of the drum 30 can be coupled to an outer circumferential surface of the rotary housing 330. As a result, when the rotary housing 330 rotates, the drum 30 can rotate with the rotary housing 330. The rotary housing 330 can include a drum serration coupled to the bottom surface of the drum 30.

In order to rotate the drum 30, there is a need for the housing 300 to be selectively coupled to the driver 100. For example, when the housing 300 rotates by the driver 100, the drum 30 can rotate separately and independently from the rotation of the rotary shaft 200. Accordingly, the drum 30 can rotate independently of the agitator 40.

The gear unit 340 can be coupled to or engaged with the first end unit 132 within the gear housing 320.

The gear unit 340 can include a sun gear 341 provided at the outer circumferential surface of the first end unit 132, at least two planetary gears 342 provided along the circumference of the sun gear 341 to rotate in engagement with the sun gear 341, a ring gear 343 provided in a ring shape to accommodate the planetary gears 342 and engaged with the planetary gears 342 at the inner circumferential surface thereof, and a carrier 344 rotatably provided in the gear housing 320 to provide rotary shafts of the planetary gears 342.

The sun gear 341 can be coupled to the first end unit 132. For example, the sun gear 341 can accommodate the first end unit 132.

In addition, the sun gear 341 can be provided integrally with the first end unit 132. For example, a serration can be provided on the outer circumferential surface of the first end unit 132 so that the sun gear 341 can be provided.

In some implementations, the sun gear 341 can be provided with the serration on the outer circumferential surface thereof, and can rotate at the same rpm (revolutions per minutes) as the drive shaft 130.

The sun gear 341 can have a disc-shaped cross-section, and the planetary gear 342 can also have a disc-shaped cross-section. In some implementations, the ring gear 343 can have a ring shape.

The ring gear 343 can have a larger diameter than the sun gear 341. For example, a plurality of planetary gears 342 can be disposed between the sun gear 341 and the ring gear 343.

The ring gear 343 can be fixed or coupled to the inner circumferential surface of the housing 300, or can rotate separately from the housing 300.

The planetary gear 342 can include a serration that can rotate by engaging with the sun gear 341 at the outer circumferential surface thereof. The sun gear 341 can include a serration that can rotate by engaging with the planetary gear 342 at the inner circumferential surface thereof.

The rotary shaft 200 can be integrally provided with the carrier 344, and can be coupled to the carrier 344. The rotary shaft 200 can be separated from the drive shaft 130. Therefore, even though the drive shaft 130 rotates, the rotary shaft 200 can independently rotate without being directly affected by the drive shaft 130.

When the sun gear 341 rotates, the planetary gear 342 is engaged with the sun gear 341 to rotate in the opposite direction to the sun gear 341. At this time, the planetary gear 342 can also be engaged with the ring gear 343. When the ring gear 343 is fixed to the gear housing 320, the planetary gear 342 rotates in the same direction as the sun gear 341 along the circumference of the sun gear 341 by action and reaction. Thus, the carrier 344 can rotate in the same direction as the sun gear 341 rotating along the circumference of the sun gear 341, and the carrier 344 can rotate in the same direction as the sun gear 341. Accordingly, the agitator 40 can rotate in the same manner as the sun gear 341.

Depending on whether the carrier 344 or the housing 300 is constrained, the drum 30 can rotate in the opposite direction to the agitator 40, and the drum 30 may not rotate regardless of rotation of the agitator 40.

In some implementations, when the housing 300 is fixed to the driver 100 and rotates in the same direction as the drive shaft 130, the ring gear 343 and the sun gear 341 rotate in the same direction, and the carrier 344 is fixed without being rotated, so that the carrier 344 connected to the rotary shaft of the planetary gear 342 rotates in the same direction as the drive shaft 130.

Accordingly, the drum 30 can rotate at the same rpm as the drive shaft 130 by the rotary housing 330, and the agitator 40 can also rotate at the same rpm as the drive shaft 130.

The guide housing 310 can rotate integrally with the gear housing 320. The guide housing 310 can be coupled to and fixed to the gear housing 320, and can also be provided integrally with the gear housing 320.

The clutch unit (C) can include a coupler 400 that can selectively connect or couple the housing 300 to the driver 100.

In some implementations, a coupling state in which the driver 100 and the housing 300 are coupled to each other by the coupler 400 may refer to a state in which power of the driver 100 can be transferred to the housing 300.

For example, the coupling state may refer to a state in which the housing 300 rotates at the same rpm as the rotor 120 or the drive shaft 130 by the coupler 400.

The housing 300 can be spaced apart from the rotor 120 at an upper portion of the rotor 120, and can accommodate the drive shaft 130.

The coupler 400 can reciprocate between the guide housing 310 and the rotor 120.

When the coupler 400 ascends to interconnect the guide housing 310 and the seating unit 121, the output of the driver 100 can be transmitted to the guide housing 310 without change.

Accordingly, the housing 300 can rotate at the same rpm as the rotor 120, and the drum 30 coupled to the housing 300 can also rotate in the same manner as the rotor 120. At this time, since the carrier 344 rotates integrally with the drive shaft 130, the agitator 40 can also rotate in the same manner as the rotor 120.

As a result, the drum 30 and the agitator 40 can rotate integrally, so that a washing process, a rinsing process, a dehydration process, etc. can be performed.

Referring to FIG. 3B, when the coupler 400 descends, the coupler 400 can separate the driver 100 and the guide housing 310 from each other. At this time, the coupler 400 can be seated on the seating unit 121.

In some implementations, when the drive shaft 130 rotates, the housing 300 does not rotate by the drive shaft 130, and only the gear unit 340 rotates so that the rotary shaft 200 and the agitator 40 can rotate.

Accordingly, the agitator 40 can rotate independently of the drum 30, and a washing process, a rinsing process, etc. other than the dehydration process can be performed.

In some implementations, the coupler 400 can be provided to selectively connect the drive shaft 130 to the guide housing 310. For convenience of explanation, the coupler 400 will be described with reference to selective coupling between the guide housing 310 and the rotor 120.

The coupler 400 can be seated on the moving unit 500 to reciprocate between the guide housing 310 and the rotor 120. Upon receiving power from the actuator 800, the coupler 400 may allow the coupler 400 to ascend in a manner that the guide housing 310 and the rotor 120 can be coupled to each other, or may allow the coupler 400 to descend in a manner that the guide housing 310 and the rotor 120 can be separated from each other by the coupler 400.

In some implementations, the drive shaft 130 and the rotary shaft 200 can be rotatably supported by an inner bearing 150 accommodated in the housing 300. In addition, the housing 300 can be rotatably supported by an external bearing 140 installed at the bottom surface of the cover unit 1000 or the tub 20.

The laundry treatment apparatus may allow the clutch unit (C) to overlap the driver 100, so that a space occupied by the clutch unit (C) separately from the driver 100 can be significantly reduced.

The laundry treatment apparatus may allow the clutch unit (C) to be installed in the driver in a manner that the driver 100 and the clutch unit (C) are arranged to overlap each other, so that the volume of the entire structure including the driver 100 and the clutch unit (C) can be minimized.

In addition, the clutch unit (C) is installed in the driver 100 so that the driver 100 and the clutch unit (C) can be manufactured as a single module.

Figure 4:
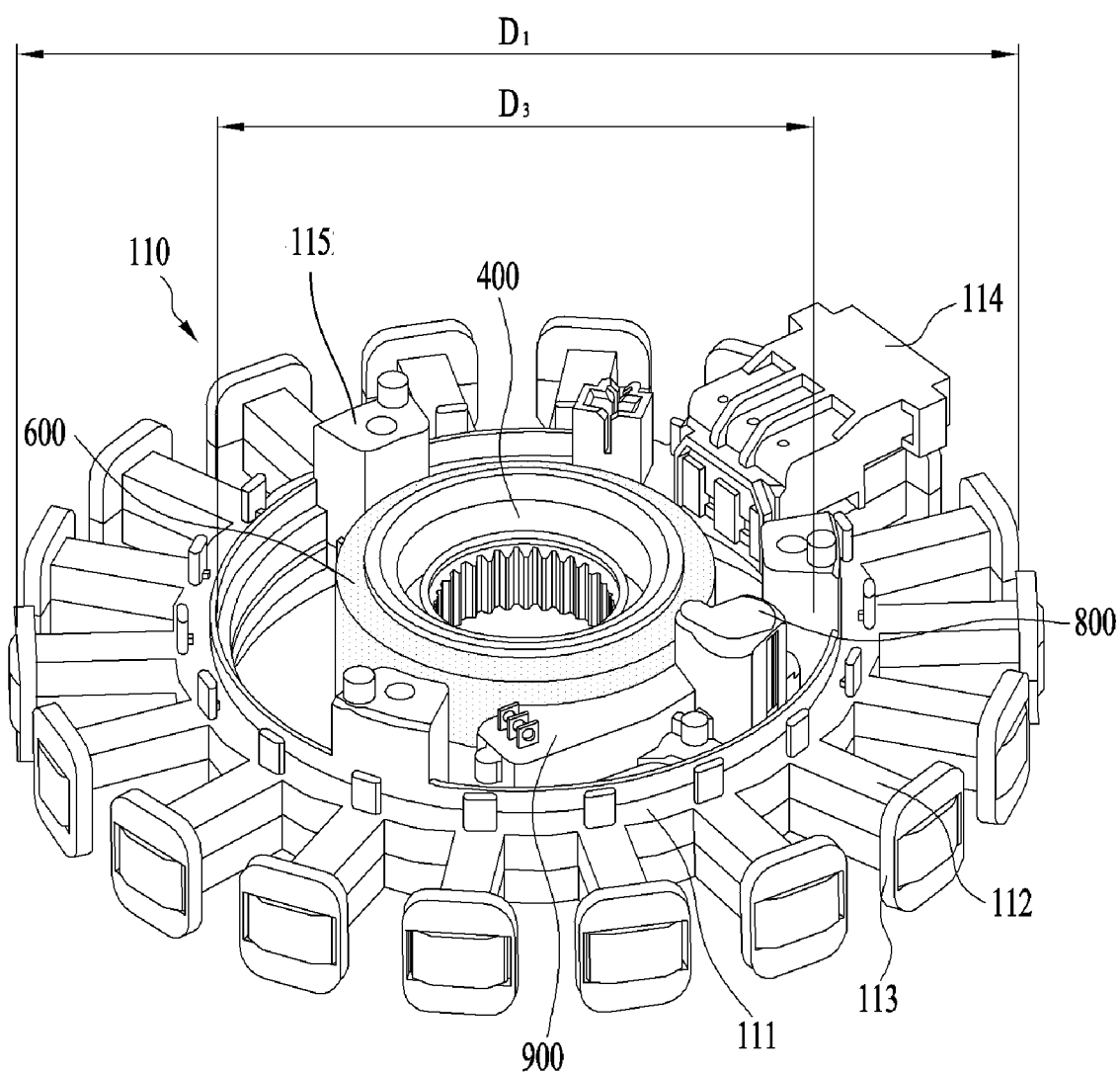
FIG. 4 is a diagram illustrating an installation structure of the clutch unit (C) and the driver of the exemplary laundry treatment apparatus.

FIG. 4 is a diagram illustrating an installation structure of the clutch unit (C) and the driver of the exemplary laundry treatment apparatus.

Referring to FIG. 4, the clutch unit (C) of the laundry treatment apparatus can further include an actuator 800 for providing power to the moving unit 500.

At least a portion of the actuator 800 can be disposed inside the driver 100. In addition, at least a portion of the actuator 800 can be disposed to overlap the driver 100.

Accordingly, since there is no space occupied by the actuator 800 separately from the driver 100, the clutch unit (C) and the driver 100 can be very densely designed.

In addition, a space occupied by the actuator 800 and the clutch unit (C) is significantly reduced, so that the height of the tub 20 can increase, resulting in an increase in the washing volume.

In addition, the clutch unit (C) including the actuator 800 can be modularized to be assembled to the driver 100, and the driver 100 and the clutch unit (C) can be modularized and installed in the tub 20. Therefore, the installation process can be simplified.

The stator 110 can include a core 111 fixed to the tub 20 and allowing the drive shaft 130 to pass therethrough, a fixing rib 112 radially extending from the outer circumferential surface of the core 111 and having a coil wound thereon, a pole shoe 113 provided at a free end of the fixing rib 112 to face the rotor 120, and a terminal 114 fixed to the core 111 to supply current to the coil.

The core 111 can include an installation unit 115 that can be coupled to the bottom surface of the tub 20 or the bearing housing 23. The installation unit 115 can have a pillar shape and can extend from the core 111 toward the bottom surface of the tub 20.

The terminal 114 can be controlled by a controller of the laundry treatment apparatus to supply a three-phase current to the coil, so that the rotor 120 can rotate.

The cross-sectional area of the pole shoe 113 can be larger than the cross-sectional area of the fixing rib 112, and the coil can be blocked from being separated from the pole shoe 113.

At least a portion of the actuator 800 can be disposed in the core 111. Accordingly, the actuator 800 can be installed using the inner space of the stator 110, and can share the space occupied by the stator 110.

The clutch unit (C) of the laundry treatment apparatus can further include a sensor unit 900 for sensing whether the moving unit 500 ascends or descends. In some implementations, the sensor unit 900 can be disposed in the driver 100, and the sensor unit 900 can also be installed in the core 111.

As a result, both the actuator 800 and the sensor unit 900 can be disposed in the core 111. Therefore, the sensor unit 900 can be installed using the inner space of the stator 110, and can share the space occupied by the stator 110.

In some implementations, the sensor unit 900 can be in direct contact with the moving unit 500 or the coupler 400 to sense whether the moving unit 500 or the coupler 400 ascends. Accordingly, the actuator 800 and the sensor unit 900 can be spaced apart from each other and separated from each other.

The coupler 400 can be seated in the moving unit 500 to ascend together with the moving unit 500. The coupler 400 can be disposed to be accommodated in the moving unit 500.

The clutch unit (C) of the laundry treatment apparatus can further include a case 600 coupled to the driver 100 to accommodate the moving unit 500 so that the moving unit 500 can ascend. Accordingly, the coupler 400 can be accommodated in the case 600 so that the coupler 400 can be elevated by the moving unit 500. At this description, the expression "elevate" includes the meaning of "reciprocate, ascend and descend, or move up and down".

The case 600 can be installed in the core 111. Accordingly, the case 600 can be installed using the inner space of the stator 110, and can share a space occupied by the stator 110.

As a result, the clutch unit (C) can be installed using the inner space of the stator 110, and can share a space occupied by the stator 110. Therefore, the space occupied by the clutch unit (C) separately from the driver 100 can be omitted or reduced, thereby significantly reducing a space between the tub 20 and the driver 100.

Therefore, the height of the tub 20 can further increase, and a distance (a spacing) between the driver 100 and the tub 20 can be further reduced in size.

As a result, the size of the clutch unit (C) can be entirely smaller in size than the diameter D1 of the driver. The size of the clutch unit (C) can be entirely smaller in size than the diameter (D3) of the inner circumferential surface of the core 111. As a result, a total diameter of the clutch unit (C) can be smaller than the core diameter (D3).

In addition, the clutch unit (C) can be disposed to overlap the height of the driver 100. For example, the clutch unit (C) can be disposed to overlap the height occupied by the stator 110.

As a result, the clutch unit (C) can be installed by maximally utilizing the space occupied by the stator 110. As a result, the volume occupied by the clutch unit (C) separately from the driver 100 can be minimized.

In addition, the clutch unit (C) can be coupled to or installed in the stator 110 to be installed in the laundry treatment apparatus. The clutch unit (C) and the driver 100 can be manufactured as a single module. As a result, the installation process of the clutch unit (C) and the driver 100 can be greatly simplified.

Figure 5:
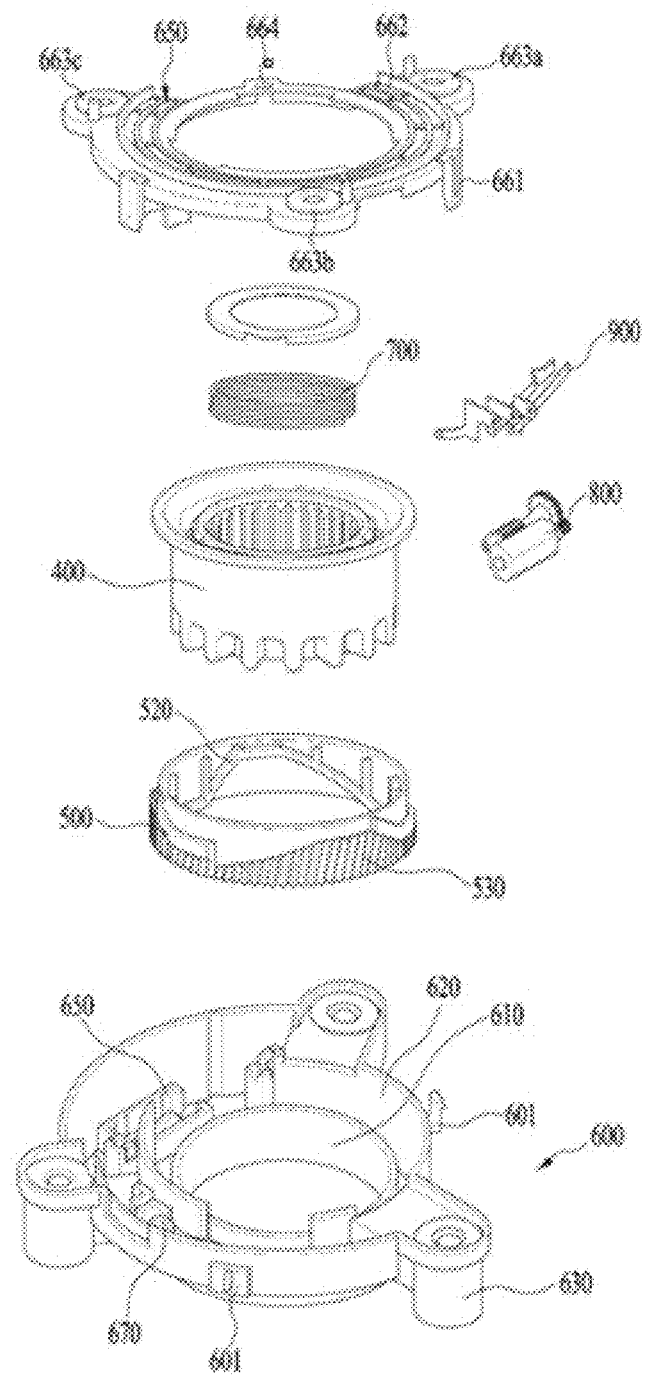
FIG. 5 is a diagram illustrating a structure that includes the clutch unit (C) in the driver 100 of the exemplary laundry treatment apparatus.

FIG. 5 is a diagram illustrating one example of a structure that can operate when the clutch unit (C) of the exemplary laundry treatment apparatus is installed in the driver 100.

Figure 10A:
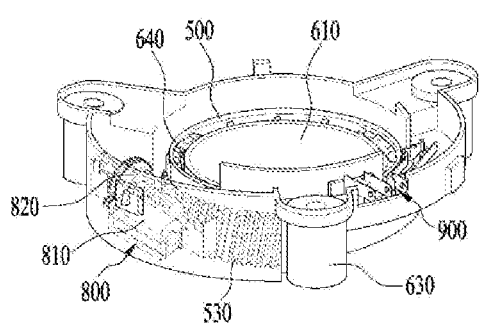
FIGS. 10A and 10B are diagrams illustrating a coupling state when the moving unit ascends.
Figure 10B:
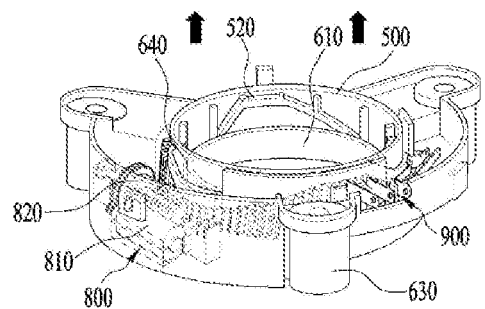

The case 600 can include a receiving body 610 for guiding elevation of the moving unit 500 and the coupler 400, a coupling unit 630 extending from the receiving body 610 and coupled/fixed to the stator 110, and an elevation rib 640 provided at one surface of the receiving body 610 to support the moving unit 500 (see FIG. 10B).

In some implementations, the elevation rib 640 can be fixed to the case 600, and can be disposed anywhere in the case 600 to support the moving unit 500.

The receiving body 610 can have a cylindrical shape or a pipe shape.

The receiving body 610 can be disposed in the moving unit 500 to guide elevation of the moving unit 500.

Each of the elevation ribs 640 can protrude from the outer circumferential surface of the receiving body 610, and the plurality of elevation ribs 640 can be spaced apart from each other along the outer circumferential surface of the receiving body 610. The elevation rib 640 can be provided to support a load of the moving unit 500.

Figure 12A:
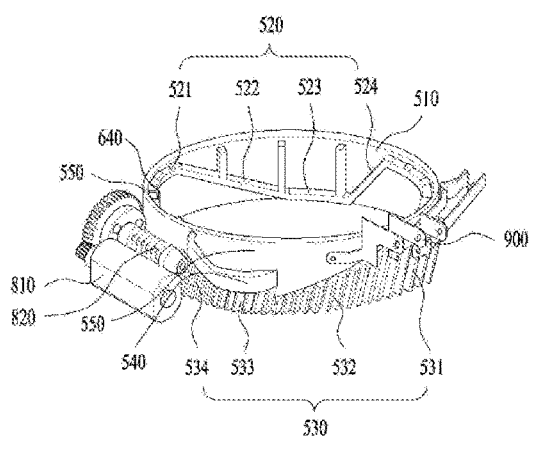
FIGS. 12A and 12B are diagrams illustrating a coupling state when the moving unit ascends.
Figure 12B:
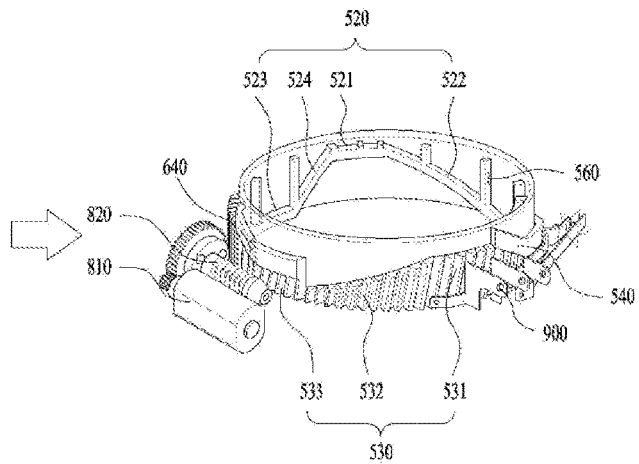

The moving unit 500 can include a movable body 510 that supports the coupler 400 and rotates by the actuator 800, and an elevation guide unit 520 provided to be supported by the elevation rib 640 to elevate the movable body 510 (see FIGS. 12A and 12B).

The movable body 510 can have a cylindrical shape or a pipe shape to accommodate the receiving body 610.

The elevation guide unit 520 can be supported by an upper end of the elevation rib 640 at one surface of the movable body 510. The elevation guide unit 520 can be provided so that one surface of the movable body 510 protrudes or is inserted to be seated at the upper end of the elevation rib 640.

The elevation guide unit 520 can be provided along the inner circumferential surface of the movable body 510. The elevation guide unit 520 can be provided to have different heights from the inner circumferential surface of the movable body 510. As a result, the elevation guide unit 520 can ascend or descend while sliding along the elevation rib 640.

The moving unit 500 can further include gear teeth 530 that can rotate by engaging with the actuator 800. The gear teeth 530 can receive power generated by the actuator 800 at one surface of the movable body 510.

The gear teeth 530 can be provided at the outer circumferential surface of the movable body 510, and can be provided along the circumference of the movable body 510. The gear teeth 530 can have a serrated shape so as to be directly engaged with the actuator 800 at the surface of the gear teeth 530.

As a result, a separate intermediary unit for connecting the actuator 800 to the moving unit 500 can be omitted, and the actuator 800 can directly rotate the moving unit 500.

Accordingly, the actuator 800 can rotate the moving unit 500 by one or more rotations, and can transmit all outputs of the actuator 800 to the moving unit 500 without change.

In some implementations, in order to reinforce the rigidity of the moving unit 500 or to increase the coupling force of the moving unit 500, the gear teeth 530 can protrude from the movable body 510 to the outside with greater thickness.

In some implementations, the gear teeth 530 can be thicker than the movable body 510.

The moving unit 500 can further include a contact unit 540 protruding outward from the surface of the movable body 510 such that the contact unit 540 can be in contact with the sensor unit 900 (see FIGS. 12A and 12B).

The sensor unit 900 can be in direct contact with the moving unit 500 to sense the position of the moving unit 500. As a result, the sensor unit 900 can be separated from the actuator 800, and the position of the moving unit 500 can be more accurately sensed.

The coupler 400 can include a coupler body 410 seated in the movable body 510 (see FIG. 7). The coupler body 410 can be accommodated in the movable body 510, and can have a cylindrical shape or a pipe shape.

An upper portion of the coupler body 410 can be provided with an extension support 411 seated on a top surface of the movable body 510, and a lower portion of the coupler body 410 may be provided with a rotor coupling unit 412 fixed to the rotor 120 (see FIG. 7).

The extension support 411 can be larger in size than the diameter of the coupler body 410, and the rotor coupling unit 412 can include teeth or gear teeth to strengthen the coupling force with the rotor 120.

The bushing unit 160 of the rotor 120 can be formed in a shape that can be engaged with the rotor coupling unit 412.

The coupler body 410 can be elevated together with the movable body 510, and, at the same time, the rotor coupling unit 412 can be detachably coupled to the bushing unit 160.

The rotor coupling unit 412 can be disposed not only at the bottom surface of the coupler body 410, but also at the outer circumferential surface of a lower portion of the coupler body 410. As a result, the rotor coupling unit 412 can be coupled not only to the upper end of the bushing unit 160, but also to the side surface of the bushing unit 160.

The coupler 400 can further include a shaft coupling unit 420 coupled to the housing 300 (see FIG. 7). The shaft coupling unit 420 can be accommodated in the coupler body 410, and can be detachably coupled to the outer circumferential surface of the guide housing 310.

The shaft coupling unit 420 can have a cylindrical shape or a pipe shape, and can be smaller in size than a diameter of the coupler body 410. The shaft coupling unit 420 can extend from the rotor coupling unit 412 toward the extension support 411.

The inner circumferential surface of the shaft coupling unit 420 can be provided with a coupling screw 421 that can be engaged with the outer circumferential surface of the guide housing 310, and the outer circumferential surface of the guide housing 310 can be provided with a serration that can be engaged with the coupling screw 421 (see FIG. 7).

The shaft coupling unit 420 can also be coupled to the inner circumferential surface of the seating unit 121 of the rotor 120. For example, the inner circumferential surface of the bushing unit 160 of the rotor 120 can be provided with a serration that can rotate by engaging with the coupling screw 421.

When the coupler 400 ascends, the shaft coupling unit 420 can connect the rotor 120 to the rotary housing 330, and the rotary housing 330 can rotate with the rotor 120.

When the coupler 400 descends, the shaft coupling unit 420 can be separated from the rotary housing 330, and the rotary housing 330 may not be constrained to the rotor 120.

A receiving groove 430 can be disposed between the inner circumferential surface of the coupler body 410 and the outer circumferential surface of the shaft coupling unit 420 (see FIG. 7).

A restoring unit 700 for restoring the position of the coupler 400 can be disposed in the receiving groove 430. One end of the restoration unit 700 can be in contact with the housing 300, and the other end of the restoring unit 700 can be in contact with the coupler 400. The restoring unit 700 may be formed of an elastic material to generate a restoring force.

Accordingly, when the coupler 400 ascends, the restoring unit 700 can be compressed, and when the moving unit 500 descends, the restoring unit 700 can push the coupler 400 toward the moving unit 500 so that lower the coupler 400 descends.

In some implementations, the height of the coupler body 410 can be higher than the height of the shaft coupling unit 420. As a result, the restoring unit 700 can block the coupler body 410 from being separated from the coupler body 410.

The actuator 800 and the sensor unit 900 can be seated in the case 600.

As a result, the actuator 800, the sensor unit 900, the coupler 400, and the moving unit 500 may all be installed in the case 600. Accordingly, the case 600 can be configured as a module of one clutch unit (C).

Therefore, the clutch unit (C) can be completely installed only by coupling the case 600 to the driver 100.

In addition, since the case 600 is disposed in the core 111, all the components of the clutch unit (C) can be disposed in the core 111. Therefore, the volume or height occupied by the clutch unit (C) separately from the driver 100 can be omitted or reduced.

As a result, the height of the tub 20 can further increase, and a gap between the tub 20 and the driver 100 can be more densely arranged.

The actuator 800 can include a power generation unit 810 for generating power for rotating the moving unit 500 (see FIGS. 6A and 6B). The power generation unit 810 can directly contact the moving unit 500 to rotate the moving unit 500.

The actuator 800 can further include a transfer unit 820 to transmit the output of the power generation unit 810 to the moving unit 500 (see FIGS. 6A and 6B). The transfer unit 820 can further enlarge a contact area with the moving unit 500 as compared to the power generation unit 810. The transfer unit 820 can be formed in a worm gear shape that can rotate while being engaged with the outer circumferential surface of the moving unit 500 in a tangential direction.

The case 600 can further include an outer body 620 that is disposed outside the receiving body 610 to block at least one of the actuator 800, the sensor unit 900, the moving unit 500, or the coupler 400 from being exposed to the outside.

The outer body 620 can be disposed parallel to the receiving body 610, and can have a larger diameter than the receiving body 610. A space can be defined between the outer body 620 and the receiving body 610, so that at least one of the actuator 800, the sensor unit 900, or the moving unit 500 can be seated or installed in the space.

In some implementations, whereas the outer body 620 has a larger diameter than the receiving body 610, the outer body 620 can be spaced apart from the inner circumferential surface of the core 111. As a result, air can flow between the outer body 620 and the inner circumferential surface of the core 111, thereby preventing the driver 100 from overheating.

In addition, the outer body 620 can be spaced farther apart from the inner circumferential surface of the core 111, except for a space in which the actuator 800 and the sensor unit are installed.

The coupling unit 630 can be implemented as a plurality of coupling units extending radially from the outer body 620. The coupling units 630 can extend from the outer body 620 toward the inner circumferential surface of the core 111, and can be coupled to the core 111 so that the case 600 can be fixed to the inside of the stator 110.

The coupling units 630 can be spaced apart from the receiving body 610 at intervals of a predetermined angle obtained when 360 degrees are divided by the number of coupling units 630. As a result, the coupling units 630 can disperse a weight of the case 600, thereby supporting the case 600.

The case 600 can further include an upper cover 660 that accommodates at least one of the moving unit 500 (see FIGS. 9A and 9B), the actuator 800, or the sensor unit 900 to block the moving unit 500, the actuator 800, and the sensor unit 900 from being separated or to block the installation position of the moving unit 500, the actuator 800, and the sensor unit 900 from varying.

The upper cover 660 can include a cover body 662 provided to shield an upper end of the case 600, and a fixing hook 661 provided on the outer circumferential surface of the cover body 662 and detachably coupled to the case 600.

The cover body 662 can include a hole through which the moving unit 500 and the coupler 400 can be drawn out or inserted, and can be provided to shield the upper end of the case 600.

The fixing hook 661 can be implemented as a plurality of fixing hooks 661 on the cover body 662, and the case 600 can further include a coupling hook 601 detachably coupled to the fixing hook 661.

The cover body 662 can have a disc shape.

The upper cover 660 can further include an upper fixing unit 663 for coupling the cover body 662 to the inside of the core 111. The upper fixing unit 663 can be implemented as a plurality of upper fixing units 663 extending radially from the cover body 662, and the plurality of upper fixing units 663 can be spaced apart from each other at intervals of a predetermined distance. The upper fixing units 663 can be coupled to the upper end of the coupling unit 630, and can be provided corresponding in number to the coupling units 630.

In some implementations, a through-section through which air can flow can be secured between the coupling unit 630 and the driver 100, so that the heat dissipation effect of the driver 100 can be maximized.

In some implementations, the actuator 800 and the sensor unit 900 may not be installed between a specific coupling unit 630 and another coupling unit 630 adjacent to the specific coupling unit 630. As a result, the heat radiation effect of the driver 100 can be maximized by securing many more through-sections.

For example, when the coupling unit 630 is implemented as three coupling units 630, the upper fixing unit 663 can also be implemented as three upper fixing units 663.

The upper fixing units 663 can include a first upper fixing unit 663a extending from the cover body 662 toward the core 111, a second upper fixing unit 663b spaced apart from the first upper fixing unit 663a and extending from the cover body 662 toward the core 111, and a third upper fixing unit 663c spaced apart from the first upper fixing unit 663a and the second upper fixing unit 663b and extending from the cover body 662 toward the core 111.

The actuator 800 can be provided between the first upper fixing unit 663a and the second upper fixing unit 663b, and the sensor unit 900 can be provided between the second upper fixing unit 663b and the third upper fixing unit 663c.

In some implementations, a space penetrating the case 600 can be provided between the first upper fixing unit 663a and the third upper fixing unit 663c. As a result, the driver 100 can be prevented from overheating.

In addition or alternatively, the actuator 800 and the sensor unit 900 can be disposed concentrically between the first upper fixing unit 663a and the second upper fixing unit 663b.

As a result, it is possible to guarantee a larger region defined to penetrate a gap between the case 600 and the driver 100. Therefore, the heat dissipation effect of the driver 100 can be further maximized.

FIGS. 6A and 6B are diagrams (cross-sectional view) illustrating the operation principles of the clutch unit (C).

Referring to FIG. 6A, the coupler 400 can be coupled to the outer circumferential surface of the detachable housing corresponding to a lower portion of the housing 300. Specifically, the outer circumferential surface of the guide housing 310 can be in contact with the inner circumferential surface of the coupler 400.

The outer circumferential surface of the guide housing 310 can be provided with a detachable serration that can be engaged with the coupling screw 321 provided on the inner circumferential surface of the shaft coupling unit 420 of the coupler 400.

As a result, the guide housing 310 and the coupler 400 can be maintained in a coupled state. When the coupler 400 rotates, the guide housing 310 can rotate by receiving force from the detachable serration through the coupling screw 421.

The coupler 400 can ascend or descend along the longitudinal direction of the guide housing 310.

The case 600 can be coupled to the tub 20 or to the driver 100, and the case 600 can be disposed outside the guide housing 310.

The lower end of the case 600 can be disposed parallel to the lower end of the guide housing 310, or can be disposed above the lower end of the guide housing 310.

The actuator 800 can be disposed at a side surface of the guide housing 310. The actuator 800 can be seated in the case 600, and can be spaced apart from the outer circumferential surface of the guide housing 310 in a horizontal direction.

When the actuator 800 is provided with the power generation unit 810 and the transfer unit 820, the power generation unit 810 and the transfer unit 820 can be spaced apart from one side of the guide housing 310 by a predetermined distance.

The actuator 800 can be engaged with the moving unit 500 to elevate the moving unit 500.

The moving unit 500 can be disposed between the actuator 800 and the outer circumferential surface of the guide housing 310, and can thus support the coupler 400. The lower end of the guide housing 310 can be disposed to be spaced apart from the bushing unit 160.

The outer side of the bushing unit 160 can be coupled to the rotor 120, and the inner side of the bushing unit 160 can be coupled to the drive shaft 130.

The moving unit 500 can be elevated by the actuator 800, so that the coupler 400 can be spaced apart from the bushing unit 160. Accordingly, when the rotor 120 rotates, the rotational force of the rotor 120 may not be transmitted to the housing 300.

In some implementations, when the rotor 120 rotates, the bushing unit 160 and the drive shaft 130 can rotate such that the gear unit 340 such as the sun gear 341 and the planetary gear 342 may rotate, but the housing 300 may not rotate.

As a result, the agitator can rotate but the drum may not rotate.

Referring to FIG. 6B, the actuator 800 can be driven so that the moving unit 500 can descend. Therefore, the coupler 400 can descend so that the coupler 400 can be coupled to the bushing unit 160.

In some implementations, the lower end of the coupler 400 can be coupled to the bushing unit 160, so that the housing 300 and the bushing unit 160 can be coupled to each other.

Therefore, when the rotor 120 rotates, the bushing unit 160 rotates so that the coupler 400 can rotate. In some implementations, the coupler 400 and the housing 300 can be serration-coupled to each other, and the coupler 400 can rotate the housing 300 so that the drum 30 can rotate.

In some implementations, when the rotor 120 rotates, the drive shaft 130 rotates, so that the drum 30 and the agitator 40 can rotate in the same direction at the same rpm.

Therefore, in a state in which the coupler 400 is coupled to the housing 300, the coupler 400 is detachably coupled to the bushing unit 160 or the rotor 120, and the coupler 400 can selectively rotate the housing 300.

FIG. 7 is a diagram illustrating a structure in which the coupler is spaced apart from or separated from the rotor.

Referring to FIG. 7, the coupler 400 can include a coupler body 410 accommodated in the moving unit 500, and a shaft coupling unit 420 accommodated in the coupler body 410 and coupled to the outer circumferential surface of the housing 300.

Since the shaft coupling unit 420 is provided with the coupling screw 421 therein as described above, the shaft coupling unit 420 can be blocked from freely rotating in the housing 300. A detachable serration provided at the outer circumferential surfaces of the coupling screw 421 and the housing 300 can be parallel to the drive shaft 130.

The lower end of the coupler body 410 can be provided with the rotor coupling unit 412 that can be coupled to the bushing unit 160.

The rotor coupling unit 412 and the bushing unit 160 can be coupled to each other in a concavo-convex shape.

In some implementations, assuming that the rotor coupling unit 412 and the bushing unit 160 can be engaged with each other to block occurrence of slip, the rotor coupling unit 412 and the bushing unit 160 can be provided in any forms.

For example, the rotor coupling unit 412 can include a plurality of coupling grooves 4122, each of which is recessed to a predetermined depth toward either the inner side of the coupler body 410 or the receiving groove 430 in which the restoring unit 700 is received. The depth or length of each of the coupling grooves 4122 can correspond to the width of the receiving groove 430.

The coupling grooves 4122 can be spaced apart from each other along the circumference of the rotor coupling unit 412. As a result, the lower end of the coupler body 410 can be provided with coupling protrusions 4121, each of which protrudes from a gap between the coupling grooves 4122.

The coupling protrusions 4121 can be provided to partition the plurality of coupling grooves 4122.

In some implementations, the bushing unit 160 can include a bushing body 161 coupled to the rotor 120 to rotate together, and a coupling unit 162 disposed in the bushing body 161 to be coupled to the rotor coupling unit 412.

The coupling unit 162 can be provided at the center of the bushing body 161, and can include a shaft through-hole 164 provided at the inner circumferential surface thereof so that the drive shaft 130 can pass therethrough.

The coupling unit 162 may have a diameter corresponding to the diameter of the coupler body 410, and may include at least one seating protrusion 1621 that can be inserted into the coupling groove 4122.

The seating protrusions 1621 can be provided to correspond to the position and number of the coupling grooves 422 so as to be inserted into the coupling grooves 4122, and a seating groove 1622 capable of receiving the coupling protrusion 4121 can be provided between the seating protrusions 1621.

The width of the seating groove 1622 can correspond to the width of the coupling protrusion 4121, and the width of the seating protrusion 1621 can correspond to the width of the coupling groove 4122.

As a result, the coupler 400 can come into contact with the bushing unit 160 while moving up, and can be coupled to the bushing unit 160 while being engaged with the bushing unit 160.

As a result, the rotational force of the bushing unit 160 can be transmitted to the coupler 400, and the coupler 400 can be blocked from freely rotating in the rotor 120 by the rotor coupling unit 412.

The bushing unit 160 can further include a coupling support 163 for allowing the coupling unit 162 to protrude, so that the coupler 400 and the coupling unit 162 can be more quickly coupled to each other and the rigidity of the coupling unit 162 can be reinforced.

The coupling support 163 can protrude from the bushing body 161, and can have a ring shape. The coupling unit 162 can be defined in the coupling support 163.

The bushing unit 160 can further include a reinforcing rib 1611 protruding parallel to the drive shaft from the outer circumferential surface thereof. The reinforcing rib 1611 can reinforce the rigidity of the bushing unit 160, and can increase coupling force with the rotor 120.

The bushing unit 160 can further include a rotor fixing unit 1612 that can be coupled to or inserted into the rotor 120, and a fastening groove 165 through which a fastening member coupled to the rotor 120 can pass.

Figure 8A:
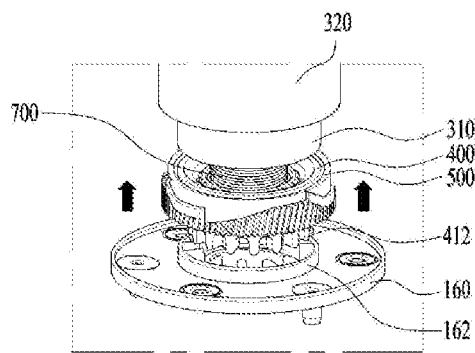
FIGS. 8A and 8B are diagrams illustrating that the clutch of the laundry treatment apparatus is detachably coupled to the rotor.
Figure 8B:
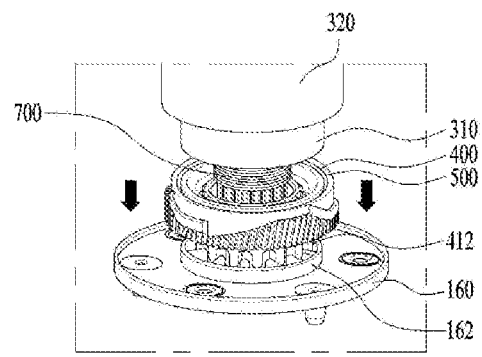

FIGS. 8A and 8B are diagrams illustrating that the clutch of the exemplary laundry treatment apparatus is detachably coupled to the rotor.

Referring to FIG. 8A, when the moving unit 500 ascends, the coupler 400 ascends and presses the restoring unit 700. When the restoring unit 700 is disposed between the coupler 400 and the housing 300 and is pressed, the restoring unit 700 serves to push the coupler 400.

When the coupler 400 ascends, the rotor coupling unit 421 of the coupler 400 can be spaced apart from the coupling unit 162 of the bushing unit 160.

Therefore, when the rotor 120 rotates, only the bushing unit 160 may rotate and the coupler 400 may not rotate.

Referring to FIG. 8B, when force for elevating the moving unit 500 disappears or the moving unit 500 descends, the coupler 400 can move toward the bushing unit 160.

When the coupler 400 contacts the bushing unit 160, the rotor coupling unit 421 can move to the coupling unit 162 due to the restoring unit 700.

Therefore, when the rotor 120 rotates, the rotor coupling unit 421 is temporarily engaged with the coupling unit 162, and the restoring unit 700 can further push the rotor coupling unit 421 to be inserted into the coupling unit 162.

In a state in which the rotor coupling unit 421 and the coupling unit 162 are engaged with each other, when the rotor 120 rotates, the coupler 400 rotates by the bushing unit 160, so that the guide housing 310 can rotate.

Figure 9A:
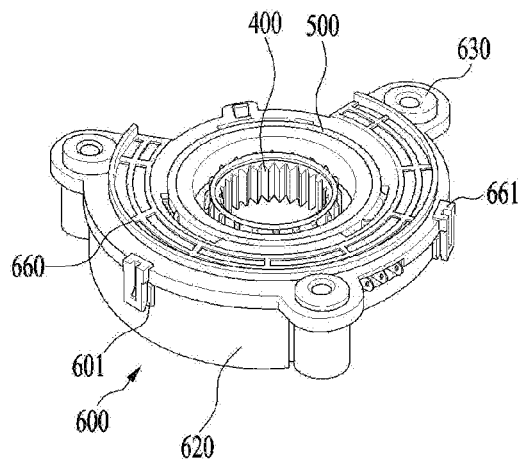
FIGS. 9A and 9B are diagrams illustrating a coupling state of the clutch when a moving unit ascends in the clutch of the exemplary laundry treatment apparatus.
Figure 9B:
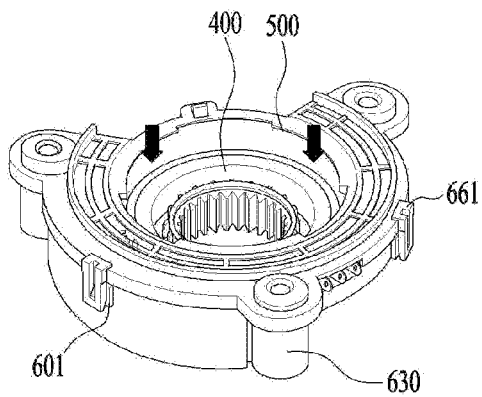

FIGS. 9A and 9B are diagrams illustrating a structure in which the moving unit and the coupler are elevated in the case.

Referring to FIG. 9A, the moving unit 500 can be accommodated in the case 600, and the coupler 400 can be seated in the moving unit 500.

The receiving body 610 and the outer body 620 of the case 600 can be shielded by the upper cover 660, and the moving unit 500 and the coupler 400 can be exposed by the upper cover 660.

The case 600 and the upper cover 660 can be detachably coupled to each other, and the upper cover 660 can be detachably coupled to a groove or a coupling hook 601 provided on the outer circumferential surface of the case 600 by the fixing hook 661.

The coupling hook 601 and the fixing hook 661 can be disposed in each gap between the coupling units 630.

When the moving unit 500 ascends in the case 600 by the actuator 800, the coupler 400 can move toward the upper portion of the upper cover 660. In some implementations, the coupler 400 can be separated from the rotor 120, and the washing or rinsing process in which the agitator 40 rotates can be performed.

Referring to FIG. 9B, the actuator 800 can allow the moving unit 500 to descend, so that the coupler 400 moves toward the lower portion of the case 600. In some implementations, the coupler 400 is coupled to the rotor 120, so that the dehydration process in which the agitator 40 and the drum 30 simultaneously rotate can be performed.

In some implementations, in the washing or rinsing process, when the agitator 40 and the drum 30 rotate together, the coupler 400 and the moving unit 500 may descend.

When the moving unit 500 descends, the inner circumferential surface of the receiving body 610 can be exposed by the case 600.

FIGS. 10A and 10B are diagrams illustrating a structure in which the moving unit is elevated in the case.

Referring to FIG. 10A, the moving unit 500 can be accommodated in the case 600, and can be seated on the bottom surface of the case 600.

The actuator 800 can be engaged with the gear teeth 530 provided on the outer circumferential surface of the moving unit 500.

In addition or alternatively, the actuator 800 can be configured such that the power generation unit 810 is engaged with the gear teeth 530.

When the transfer unit 820 is provided, the power generation unit 810 is engaged with the transfer unit 820, and the transfer unit 820 can be engaged with the gear teeth 530. The transfer unit 820 can be formed to have a gear ratio or a diameter in a manner that the rpm of the power generation unit 810 is reduced and torque of the power generation unit 810 can increase.

The sensor unit 900 can sense that the moving unit 500 descends in the case 600. The moving unit 500 and the sensor unit 900 can be in contact with each other, and the sensor unit 900 can sense the position of the moving unit 500 while contacting or being separated from the moving unit 500.

For example, the sensor unit 900 can detect a separation state in which the sensor unit 900 is separated from the moving unit 500. The controller for controlling the sensor unit 900 or receiving signals from the sensor unit 900 can recognize an operation state in which the moving unit 500 descends in the case 600, and can also recognize a coupling state between the coupler 400 and the driver 100.

The elevation guide unit 520 of the moving unit 500 can be extended with a variable height from one surface of the moving unit 500. The elevation guide unit 520 can be extended while moving between the upper end and the lower end along the inner circumferential surface of the moving unit 500.

As shown in FIG. 2, when the elevation rib 640 fixed to the case 600 supports the elevation guide unit 520 located at the upper end of the moving unit 500, the moving unit 500 can remain in a state in which the moving unit 500 descends in the case 600.

When the actuator 800 is driven, the moving unit 500 can rotate in one direction.

Referring to FIG. 10B, when the moving unit 500 rotates, the elevation guide unit 520 can slide the upper end of the elevation rib 640. Since the elevation guide unit 520 is extended to have a variable height, the elevation guide unit 520 extending from the upper end to the lower end of the moving unit 500 can be supported by the elevation rib 640. As a result, when the moving unit 500 rotates, the moving unit 500 can be supported and elevated by the elevation rib 640.

In some implementations, when the moving unit 500 ascends to a predetermined height or greater, the contact unit 540 protruding from the moving unit 500 can contact the sensor unit 900.

As a result, the sensor unit 900 can sense the situation where the moving unit 500 was elevated to a predetermined height or greater, and the controller can recognize the situation where the coupler was separated from the driver 100.

When the actuator 800 is driven again, the moving unit 500 may again descend and return to the same state as in FIG. 10A.

The gear teeth 530 of the moving unit 500 can be provided along the circumference of the moving unit 500. Therefore, the actuator 800 can rotate the moving unit by one or more rotations, and can consecutively rotate the moving unit 500 in one direction.

In some implementations, the moving unit 500 can repeatedly ascend and descend, and the coupler 400 can be repeatedly separated from or coupled to the driver 100.

As a result, the actuator 800 for use in the laundry treatment apparatus can directly rotate the moving unit 500.

The actuator 800 can transmit the generated rotational energy to the moving unit 500 without converting the rotational energy into rectilinear motion or reciprocating rotational motion having a predetermined angle.

As a result, in the laundry treatment apparatus, a separate intermediary unit capable of converting the rotational energy generated by the actuator 800 into other energy may be omitted.

Therefore, the spacing between the actuator 800 and the moving unit 500 becomes smaller in size or the actuator 800 and the moving unit 500 can be in contact with each other, so that the actuator 800 can be completely installed in the driver 100.

Figure 11A:
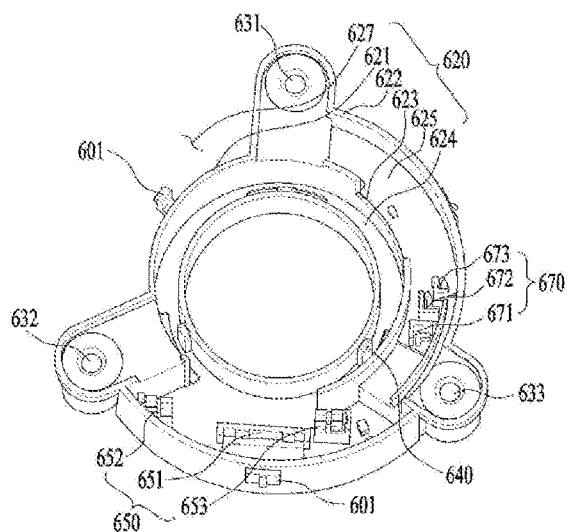
FIGS. 11A, 11B, and 11C are diagrams illustrating a structure for elevating the moving unit of the exemplary laundry treatment apparatus.
Figure 11B:
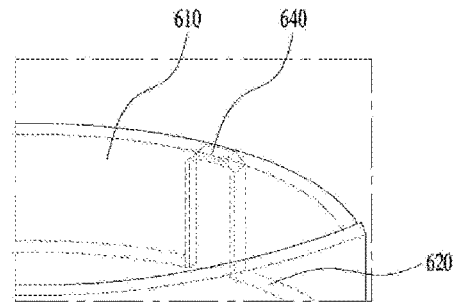
Figure 11C:
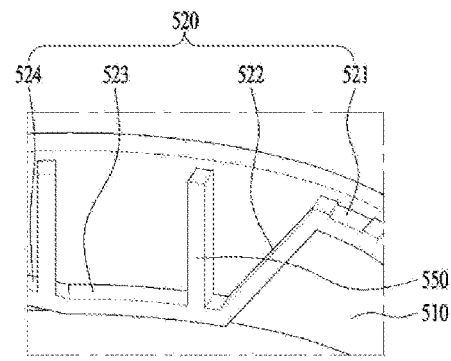

FIGS. 11A, 11B, and 11C are diagrams a structure in which the moving unit can be elevated in the case 600.

Referring to FIG. 11A, the case 600 can include a receiving body 610 for guiding elevation of the moving unit 500, an outer body 620 disposed outside the receiving body 610 to shield the moving unit 500, and a coupling unit 630 extending from the outer body 620 toward the outer circumferential surface thereof.

The outer body 620 can include a seating body 624 extending outward from the receiving body 610 and disposed under the moving unit 500, a shielding body 621 extending from the outer circumferential surface of the seating body 624 to accommodate the outer circumferential surface of the moving unit 500, an installation body 625 extending outward from the shielding body 621 to provide a space in which the actuator 800 or the sensor unit 900 is installed, and a blocking body 622 extending from the outside of the installation body 625 to shield the actuator 800 or the sensor unit 900.

The case 600 can include a motor installation unit 650 in which the actuator can be seated in the installation body 625, and a sensor installation unit 670 in which the sensor unit 900 can be installed.

The motor installation unit 650 can include a driving seating unit 651 in which the power generation unit 810 is seated, a first support 652 by which one end of the transfer unit 820 is supported, and a second support 653 by which the other end of the transfer unit 820 is supported.

Both ends of the transfer unit 820 can be rotatably disposed in the first support 652 and the second support 653, so that the transfer unit 820 can be engaged with the moving unit 500.

The sensor installation unit 670 can be provided such that each sensor structure can be seated according to the shape of the sensor unit 900.

The sensor unit 900 can be implemented as a switch in which current can flow in a plurality of conductive plates so that the current can be generated when the conductive plates are in contact with each other.

For example, when the sensor unit 900 includes three conductive plates, the sensor installation unit 670 can include a first installation unit 671 for fixing the first terminal, a second installation unit 672 for fixing the second terminal, and a third installation unit 673 for fixing the third terminal.

The coupling unit 630 can be implemented as a plurality of coupling units 630s extending radially from the outer body 620.

For example, the coupling unit 630 can include a first coupling unit 631 extending outward from the outer body 620 and fixed to the core 111, a second coupling unit 632 spaced apart from the first coupling unit 631 and fixed to the core 111, and a third coupling unit 633 spaced apart from the first coupling unit 631 and the second coupling unit 632 and fixed to the core 111.

The first coupling unit 631, the second coupling unit 632, and the third coupling unit 633 can be spaced apart from each other at the same interval with respect to the receiving body 610.

The actuator 800 can be disposed between the second coupling unit 632 and the third coupling unit 633, and the sensor unit 900 can be disposed between the first coupling unit 631 and the third coupling unit 633. Therefore, a separate structure may not be disposed between the first coupling unit 631 and the second coupling unit 632.

In the case 600, the blocking body 622 and the installation body 625 may not be installed between the first coupling unit 631 and the second coupling unit 632. Accordingly, a communication space 627 can be defined between the first coupling unit 631 and the second coupling unit 632 to dissipate heat from the driver 100.

In some implementations, the communication space 627 can be provided between the blocking body 622 and the core 111. In some implementations, since the shielding body 621 disposed between the first coupling unit 631 and the second coupling unit 632 corresponds to the outer circumferential surface, the communication space 627 may be provided more widely.

Differently from the drawings, the actuator 800 and the sensor unit 900 can be disposed only between the first coupling unit 631 and the second coupling unit 632. For example, the actuator 800 and the sensor unit 900 are concentrically disposed only between a specific coupling unit 630 and the other coupling unit 630 adjacent to the specific coupling unit 630. In the space between the remaining coupling units 630, a larger communication space 627 from which the installation body and the blocking body 622 are omitted can be secured.

The coupling hook 601 can be provided on the outer surface of the case 600. For example, the coupling hook 601 can be provided on the outer circumferential surface of the blocking body 622, or can be provided on the outer circumferential surface of the shielding body 621.

In some implementations, the case 600 can include an elevation rib 640 capable of elevating the moving unit 500 by supporting the moving unit 500. The elevation rib 640 can be provided in any of the receiving body 610, the seating body 624, and the shielding body 621 as long as it can support the moving unit 500.

Referring to FIG. 11B, when the elevation rib 640 is provided in the receiving body 610, the elevation rib 640 can protrude from the outer circumferential surface of the receiving body 610. The height of the elevation rib 640 can be equal to or smaller than the height of the receiving body 610.

The elevation ribs 640 can be spaced apart from each other at a predetermined angle along the circumference of the receiving body 610. For example, when the elevation ribs 640 are implemented as N elevation ribs, the elevation ribs 640 can be spaced apart from each other at a predetermined angle corresponding to 360/N degrees.

As a result, the moving unit 500 can be blocked from being tilted.

Referring to FIG. 11C, the elevation guide unit 520 can be provided on the inner circumferential surface of the movable body 510 to be supported by the elevation ribs 640.

The elevation guide unit 520 can include a low-point support 521 provided in the movable body 510 and a high-point support 523 disposed below the low-point support 521.

The high-point support 523 can be disposed adjacent to the lower end of the movable body 510, and the low-point support 521 can be disposed adjacent to the upper end of the movable body 510.

The low-point support 521 can be supported by the elevation rib 640 when the movable body 510 is at a low point. The high-point support 523 can be supported by the elevation rib 640 when the movable body 510 is at a high point.

The high-point support 523 and the low-point support 521 can be spaced apart from each other so as not to overlap each other in the direction of the drive shaft.

Accordingly, when the moving unit 500 rotates, the elevation rib 640 can move from the high-point support 523 to the low-point support 521, and can move from the low-point support 521 to the high-point support 523.

In the elevation guide unit 520, the low-point support 521 and the high-point support 523 can further include an elevation support 522 and a descending support 524 by which the low-point support 521 and the high-point support 523 are connected to each other.

When the movable body 510 moves from a low point to a high point, the elevation support 522 can be supported by the elevation rib 640. When the low-point support 521 is disposed at both sides of the high-point support 523, the elevation guide unit 520 can include an elevation support 522 connected from one end of the high-point support 523 to one end of the low-point support 521, and a descending support 524 connected from the other end of the high-point support 523 to the other end of the low-point support 521.

In addition, the low-point support 521 can extend from one end of the descending support 524 to the other one of the high-point support 523.

Specifically, when the moving unit 500 is provided to rotate in one direction, the moving unit 500 can further include the elevation support 522 extending from the low-point support 521 toward the high-point support 523, and the descending support 524 extending from the high-point support 523 toward the low-point support 521.

In some implementations, as the low-point support 521, the elevation support 522, the high-point support 523, and the descending support 524 can be sequentially seated in the elevation rib 640, and the movable body 510 can ascend and descend.

The moving unit 500 can include a coupler support 550 for supporting the coupler 400 within the movable body 510.

The coupler support 550 can be implemented as a plurality of coupler supports 550 spaced apart from each other and provided to extend in the elevation support 522, and the coupler supports 550 can be provided to have the same height in top ends thereof.

In some implementations, the coupler 400 can be seated in the coupler support 550, and can be elevated together with the movable body 510.

FIGS. 12A and 12B are diagrams illustrating a coupling state in which the moving unit ascends.

FIGS. 12A and 12B illustrate one example of only the elevation rib 640 adjacent to the actuator 800. The elevation rib 640 can be implemented as a plurality of elevation ribs 640. For example, the number of elevation ribs 640 may be set to 3, and three elevation ribs 640 can be spaced apart from each other at intervals of 120 degrees on the outer circumferential surface of the receiving body 610. The elevation guide unit 520 can be provided to correspond to the elevation ribs 640. For example, the elevation guide unit 520 can be implemented as three elevation guide units, and can extend along the inner circumferential surface of the movable body 510.

The moving unit 500 can include a gear teeth 530 engaged with the actuator 800 at the outer circumferential surface thereof.

The gear teeth 530 can include low-point gear teeth 531 engaged with the actuator 800 when the moving unit 500 is at a low point, and high-point gear teeth 533 engaged with the actuator 800 when the moving unit 500 is at a high point. The low-point gear teeth 531 can be disposed below the high-point gear teeth 533, and can be shorter in length than the axial length of the high-point gear teeth 533.

The gear teeth 530 can further include the ascending gear teeth 532 engaged with the actuator 800 when the moving unit 500 moves from the low point to the high point, and the descending gear teeth 534 engaged with the actuator 800 when the moving unit 500 moves from the high point to the low point.

Referring to FIG. 12A, the low-point support 521 can be supported by the elevation rib 640. In some implementations, when the low-point support 521 is implemented as a plurality of low-point supports 521, all of the low-point supports 521 can be supported by the elevation rib 640.

The actuator 800 can be in contact with the low-point gear teeth 531.

The moving unit 500 can rotate counterclockwise by the actuator 800.

The moving unit 500 can descend, so that the moving unit 500 can be located at the second height (II) (see FIGS. 13A and 13B).

The actuator 800 can be engaged with the low-point gear teeth 531 from among the gear teeth 530. The elevation rib 640 can be provided to support the lower end of the low-point support 521.

When the actuator 800 is driven, the actuator 800 can rotate the moving unit 500 counterclockwise.

The actuator 800 can rotate the moving unit 500 in a counterclockwise direction by a predetermined angle. Specifically, the actuator 800 can rotate while being engaged with the low-point gear teeth 531. In some implementations, the actuator 800 can rotate the moving unit 500 in a manner that the bottom surface of the low-point support 521 slides the upper end of the elevation rib 640.

The actuator 800 can further rotate the moving unit 500. In some implementations, the actuator 800 can rotate while being engaged with the other end of the low-point gear teeth 531, and the bottom surface of the elevation support 522 can be seated on the elevation rib 640. The elevation rib 640 can support one end through which the elevation support 522 is connected to the low-point support 521.

When the actuator 800 further rotates the moving unit 500, the actuator 800 can rotate by engaging with the ascending gear teeth 532, and the elevation rib 640 can slide from the bottom surface of one end of the elevation support 522 to the bottom surface of the other end of the elevation support connected to the high-point support 523, and at the same time can support the elevation support 522.

A difference in height between the high-point support 523 and the low-point support 521 can be set to a difference between the first height (I) and the second height (II) (see FIGS. 13A and 13B).

The elevation support 522 can be supported by the upper end of the elevation rib 640 in the range from the above-described one end to the above-described other end, and the moving unit may ascend to the first height (I) according to the slope of the elevation support 522.

Referring to FIG. 12B, the upper end of the elevation rib 640 can sequentially support the lower end of the elevation support 522 and the lower end of the high-point support 523 at the low-point support 521.

The actuator 800 can sequentially contact the ascending gear teeth 532 and the high-point gear teeth 533 at the low-point gear teeth 531.

When the high-point support 523 is seated on the elevation rib 640, the moving unit 500 can ascend to the highest position.

The sensor unit 900 can be in contact with the contact unit 540 to sense that the moving unit 500 is at a high point.

In some implementations, when the actuator 800 further rotates the moving unit 500, the upper end of the elevation rib 640 can sequentially support the lower end of the descending support 524 and the low-point support 521 at the high-point support 523. As a result, the coupling state may return to the state of FIG. 12A.

When the low-point support 521 is seated on the elevation rib 640, the moving unit 500 can descend to the lowest position.

The actuator 800 can sequentially contact the descending gear teeth 534 and the low-point gear teeth 531 at the high-point gear teeth 533.

When the moving unit 500 descends, the sensor unit 900 can be spaced apart from the contact unit 540. As a result, the controller can detect that the moving unit 500 is at a low point.

The actuator 800 can be controlled by the controller, so that the actuator 800 can elevate the moving unit 500 while rotating the moving unit 500.

The high-point support 523 can have a first length or more so that the ascending height of the moving unit 500 can be maintained for a predetermined time. The first length can correspond to a time at which the moving unit 500 can stay for a first time even if the moving unit 500 continuously rotates.

For example, the low-point support 521 can have a length by which the low-point support 521 can stay for 0.5 seconds or more.

In some implementations, the low-point support 521 can have at least a second length by which the descending height of the moving unit 500 is maintained for a predetermined time. The second length can correspond to a time at which the moving unit 500 can stay for a second time even if the moving unit 500 continuously rotates.

The second time can be 0.5 seconds.

In some implementations, the slope of the elevation support 522 can be not steeper than the slope of the descending support 524.

When the moving unit 500 rotates at a uniform speed, the length of the elevation support 522 can be longer than the length of the descending support 524.

As a result, the moving unit 500 can slowly ascend.

Therefore, the moving unit 500 can guide the coupler 400 to be stably separated from the rotor 120, and the actuator 800 can stably support the load of the coupler 400 and the moving unit 500 and at the same time can elevate the coupler 400 and the moving unit 500. In addition, the coupler 400 can ascend by stably overcoming elastic force of the restoring unit 700 and can ascend.

In some implementations, the gear teeth 530 can be disposed to correspond to the shape and length of the elevation guide unit 520.

In some implementations, the arrangement of the gear teeth 530 may not exactly match the arrangement of the elevation guide unit 520. In consideration of the actuator 800, the gear teeth 530 can be arranged alternately with the elevation guide unit 520. Even in this case, the lengths and slopes of the low-point gear teeth 531, the ascending gear teeth 532, the high-point gear teeth 533, and the descending gear teeth 534 may correspond to the lengths and slopes of the low-point support 521, the elevation support 522, the high-point support 523, and the descending support 524.

Referring to FIG. 12B, the actuator 800 can further rotate the moving unit 500, the actuator 800 can be engaged with the high-point gear support 523, and the bottom surface of the high-point support 423 can be supported by the upper end of the elevation rib 640.

When the actuator 800 stops rotation, the moving unit 500 can maintain the first height.

In addition, even though the actuator 800 is further rotated, the moving unit 500 can maintain the first height until one end connected to the elevation support 522 of the high-point support 523 and the other end connected to the descending support 524 are supported by the elevation rib 640.

When the moving unit 500 reaches the first height, the sensor unit 900 can generate a signal driving the actuator 800.

The actuator 800 can be re-engaged with the descending gear teeth by re-rotating the moving unit 500, and the elevation rib 640 can support the bottom surface of the descending support 524.

When the actuator 800 rotates by engaging with the descending gear teeth 534, the elevation rib 640 can slide and support one end connected to the high-point support 523 of the descending support 524 and the other end connected to the low-point support 521. Therefore, the moving unit 500 can descend from the first height to a second height.

As a result, when the actuator 800 is engaged with the low-point gear teeth 531, the moving unit 500 can return to the state of FIG. 12A.

When the actuator 800 stops rotation, the moving unit 500 can maintain the second height.

In addition, when the actuator 800 further rotates by engaging with the low-point gear teeth 531, the moving unit 500 may maintain the second height until the other end of the low-point support 521 is supported by the elevation rib 640.

When the moving unit 500 reaches the second height, the sensor unit 900 can generate a signal for stopping operation of the actuator 800.

As a result, the actuator 800 can continuously rotate the moving unit 500 in the same direction, and can allow the moving unit 500 to repeatedly ascend and descend. In addition, the actuator 800 can rotate the moving unit 500 in the same direction by one or more rotations.

When N elevation supports 520 are provided, the moving unit 500 can repeatedly ascend and descend N times while rotating once.

The first height can correspond to a high point of the moving unit 500.

In addition or alternatively, the first height can correspond to a height at which the coupler 400 is separated from the rotor 120. For example, the first height may not be a high point.

The second height can correspond to a low point of the moving unit 500.

In addition or alternatively, the second height can correspond to a height at which the coupler 400 is coupled to the rotor 120. For example, the second height can correspond to a height lower than the first height. In addition, the second height may not be a low point.

As described above, the sensor unit 900 of the laundry treatment apparatus can be provided to sense the height or position of the coupler 400 or the moving unit 500.

In some implementations, the sensor unit 900 can contact the actuator 800 or sense the position of the actuator 800, so that the position of the coupler 400 is not indirectly sensed and calculated.

The sensor unit 900 of the laundry treatment apparatus can directly contact the coupler 400 or the moving unit 500 to detect the height of the coupler or the moving unit. As a result, the accuracy and reliability of the sensor unit 900 configured to detect the position or height of the coupler 400 or the moving unit 500 can increase.

In addition, the sensor unit 900 of the laundry treatment apparatus can more accurately sense whether the coupler 400 couples the housing 300 to the rotor 120 or separates the housing 300 from the rotor 129.

In addition, the sensor unit 900 of the laundry treatment apparatus can accurately sense the position of the coupler 400 even when the actuator 800 is restrained or damaged.

In addition, since the sensor unit 900 of the laundry treatment apparatus operates independently of the actuator 800, the sensor unit 900 can be spaced apart from the actuator 800. Therefore, the sensor unit 900 of the laundry treatment apparatus can sense whether the coupler 400 or the moving unit 500 ascends while being spaced apart from the actuator 800.

In addition, since the sensor unit 900 and the actuator 800 can be spaced apart from each other, the sensor unit 900 and the actuator 800 can be easily separated from each other even if the inner space of the case 600 is relatively smaller in size.

As a result, since the sensor unit 900 and the actuator 800 can be spaced apart from each other, the space inside the driver 100 can be effectively utilized.

FIGS. 13A and 13B are diagrams illustrating an exemplary sensor unit.

Referring to FIGS. 13A and 13B, when the moving unit 500 reaches the first height or a high point or reaches the second height or a low point, the sensor unit 900 can be in contact with the moving unit or can be separated from the moving unit.

For example, the high point and the low point of the coupler 400 can be clearly recognized by the sensor unit 900 through either the ON/OFF signal generated when the sensor unit 900 is in contact with or is separated from the moving unit 500 or a binary signal.

In some implementations, even if the sensor unit 900 is provided as one, it is possible to sense the high and low points of the coupler 400 through the ON/OFF signal. The sensor unit 900 can be spaced apart from the upper end and the lower end of the moving unit 500, and can be formed to contact a side surface of the moving unit 500.

The sensor unit 900 can be provided to contact the moving unit 500 when the moving unit 500 reaches any one of the high point and the low point, and can be separated from the moving unit 500 when the moving unit 500 reaches the remaining one of the high point and the low point.

Referring to FIG. 13A, the moving unit 500 can be located at a low point, so that the low-point support 521 from among the elevation support 522 can be supported by the elevation rib 640.

The sensor unit 900 can be spaced apart from the moving unit 500 when the moving unit 500 is at the low point. In some implementations, when the moving unit 500 moves from the low point to the high point, the sensor unit 900 can be provided to contact the moving unit 500.

The sensor unit 900 can be provided with a plurality of conductive plates through which current can flow.

The sensor unit 900 can include a second terminal 920 selectively contacting the moving unit 500, and a first terminal 910 spaced farther from the moving unit 500 than the second terminal 920 and provided to be in contact with the second terminal 920.

The first terminal 910 and the second terminal 920 can be disposed at the same height.

The first terminal 910 and the second terminal 920 can be implemented as a switch in which current flows when the first terminal 910 and the second terminal 920 contact each other or does not flow when the first terminal 910 and the second terminal 920 are spaced apart from each other.

As a result, the controller for receiving signals from the sensor unit 900 can sense and calculate the state of the moving unit 500 through ON/OFF states of the electrical signal.

When the moving unit 500 is located at a low point, the second terminal 920 can remain spaced apart from the moving unit 500. Specifically, the second terminal 920 can remain spaced apart from a side surface of the moving unit 500 by a predetermined distance.

In some implementations, when the moving unit 500 is located at a low point, the second terminal 920 can also be located higher than the upper surface of the moving unit 500.

Referring to FIG. 13B, when the moving unit 500 ascends, the contact unit 540 can pressurize the sensor unit 900.

Specifically, when the moving unit 500 is located at a high point, the contact unit 540 can be disposed at a position where the sensor unit 900 is pressed. The position where the contact unit 540 protrudes from the moving unit 500 can be automatically determined when the installation position of the sensor unit 900 is determined.

In some implementations, when the moving unit 500 is located at the first height, the contact unit 540 can protrude from the movable body 510 to press (or pressurize) the sensor unit 900.

The contact unit 540 can protrude from the outer circumferential surface of the movable body 510.

The contact unit 540 can also be disposed at a position where the moving unit 500 can contact the sensor unit 900 when the moving unit 500 deviates from a low point.

The installation position of the contact unit 540 can vary depending on the installation position of the sensor unit 900.

When the moving unit 500 ascends to the first height, the second terminal 920 can be pressed against the contact unit 540 to be bent toward the first terminal 910, and the second terminal 920 can be in contact with the first terminal 910. As a result, the sensor unit 900 can be electrically turned on to generate the ON signal.

In some implementations, any one of the upper end and the lower end of the contact unit 540 can be opened or a through-hole 543 formed to pass through the contact unit 540 can be provided. Accordingly, when the contact unit 540 is injection-molded to protrude from the movable body 510, the shape or thickness of the contact unit 540 can be blocked from being changed during a cooling mode.

The second terminal 920 can further include a bent portion (a) that is bent toward the movable body 510 so that the second terminal 920 can more effectively contact the contact unit 540 through the bent portion (a). Thus, when the moving unit 500 reaches the first height, the moving unit 500 can also contact the second terminal 920, so that the reliability of the sensor unit 900 can increase.

The sensor unit 900 can receive power by connecting to a circuit supplying for power to the actuator 800. In addition, the sensor unit 900 can be provided to block current supply to the actuator 800. When the sensor unit 900 switches from a separation state to a contact state or switches from a contact state to a separation state with respect to the moving unit 500, the sensor unit 900 can be provided to cut off the current supply of the actuator 800.

As a result, the moving unit 500 can be blocked from rotating and can stop at the target position. The target position can be at least one of a high point (top dead center) or a low point (bottom dead center).

In some implementations, the sensor unit 900 can also be controlled by receiving power from a circuit supplying power to the driver 100.

FIGS. 14A and 14B are diagrams illustrating an exemplary structure for enabling the coupler to elevate in response to elevation of the moving unit.

Referring to FIGS. 14A and 14B, the coupler 400 can be seated on the moving unit 500, or can be disposed in the moving unit, so that the coupler 400 can elevate together with the moving unit 500.

Referring to FIG. 14A, the low-point gear teeth 531 of the moving unit 500 can be engaged with the actuator 800, and the coupler 400 can be disposed at a low point together with the moving unit 500.

In some implementations, the sensor unit 900 can be completely spaced apart from the moving unit 500, and the controller can recognize a state in which the driver 100 and the housing 300 are coupled to each other by the coupler 400.

Referring to FIG. 14B, when the moving unit 500 rotates by the actuator 800, the actuator 800 can be engaged with the high-point gear teeth 533, and the coupler 400 can be disposed at a high point together with the moving unit 500.

In some implementations, the sensor unit 900 can be in contact with the contact unit 540, and the controller can detect that the moving unit 500 and the coupler 400 are at the high point and are separated from the rotor 120.

In some implementations, the contact unit 540 can include a first contact unit 541 protruding from the movable body 510.

The first contact unit 541 can be in contact with the sensor unit 900 when the movable body 510 is at a high point. Therefore, the first contact unit 541 can be defined as a high-point contact unit.

In some implementations, the upper portion of the movable body 510 can support the coupler 400, and the lower portion of the movable body 510 can be spaced apart from the case 600 by a predetermined distance. Accordingly, the contact unit 540 can protrude from the side surface of the movable body 510, and the first contact unit 541 can protrude between the upper end and the lower end of the movable body 510.

The first contact unit 541 can be disposed at a position where the movable body 510 can contact the sensor unit 900 when the movable body 510 is located at a high point or a first height. In some implementations, the sensor unit 900 can be provided to be in contact with the first contact unit 541 when the movable body 510 is located at a high point. In addition, the sensor unit 900 can be fixed to the case 600 so that the movable body 510 can be disposed between the upper end and the lower end of the movable body 510 when the movable body 510 is located at a high point.

The contact unit 540 can include a second contact unit 542 extending from the first contact unit 541 to the upper end of the movable body 510. The second contact unit 542 can extend in a direction opposite to the rotational direction of the movable body 510, and can extend with a slope corresponding to a slope of the descending support 524.

When the sensor unit 900 starts to contact the first contact unit 541, the second contact unit 542 can allow the sensor unit 900 to remain in contact with the moving unit 500 until the sensor unit 900 descends to a predetermined height or a second height lower than the first height.

As a result, the signal of the sensor unit 900 can be continuously maintained until the moving unit 500 moves from the high point to a point located just before the low point or moves from the high point to a point located just before a coupling point between the coupler 400 and the driver 100, so that a time point where the moving unit 500 is located at the low point or a time point where the coupler 400 is coupled to the driver 100 to rotate the housing 300 can be accurately detected.

In some implementations, when the signal of the sensor unit 900 transitions to the ON state, the controller can detect a high point, so that the coupler 400 can be separated from the driver 100 and the controller can sense an operation state in which only the agitator can rotate. After sensing the operation state, although the moving unit 500 descends, only the agitator can rotate until the coupler 400 is coupled to the driver 100, so that the sensor unit 900 can maintain the ON state thereof by the second contact unit.

Then, the movable body 510 further descends, the sensor unit 900 can be separated from the contact unit 542, and the signal of the sensor unit can be turned off. As a result, the controller can recognize that the coupler 400 descends and can then be coupled to the driver 100.

In some implementations, the second contact unit 542 can be configured to maintain the signal of the sensor unit 900 until the coupler starts to be coupled to or seated in the driver 100.

In addition, the sensor unit 900 can remain separated from the moving unit 500 until the sensor unit 900 is elevated from the second height to the first height. For example, the sensor unit 900 can be separated from the contact unit 540 until the moving unit 500 ascends to the first height and the sensor unit 900 contacts the first contact unit 541.

As a result, the sensor unit 900 can start to generate the ON signal only when the moving unit 500 is located at a first height or a high point. As a result, the sensor unit 900 can be spaced apart from the driver 100 so that the sensor unit 900 can reliably detect a state of the housing 300 separated from the driver 100.

Specifically, from the state of FIG. 14B, the sensor unit 900 can be in contact with the contact unit 540 to generate the ON signal. Also, until just before the state of FIG. 14A, the sensor unit 900 can contact the second contact unit 542. When the moving unit 500 further descends, the sensor unit 900 can be separated from the second contact unit 542 or can be disposed above the second contact unit 542, thereby generating the OFF signal.

As a result, the controller can accurately sense whether the coupler 400 is fully coupled to the driver 100 through the ON/OFF signal of the sensor unit 900.

In some implementations, the contact unit 540 can further include a third contact unit extending from the second contact unit 542 in parallel along the upper end of the movable body 510. Accordingly, the sensor unit 900 can remain in contact with the contact unit 540 until just before the upper end of the movable body 510 becomes lower in height than the sensor unit 900.

In some implementations, if the upper end of the movable body 510 becomes lower in height than the sensor unit 900, the third contact may be omitted.

Figure 15:
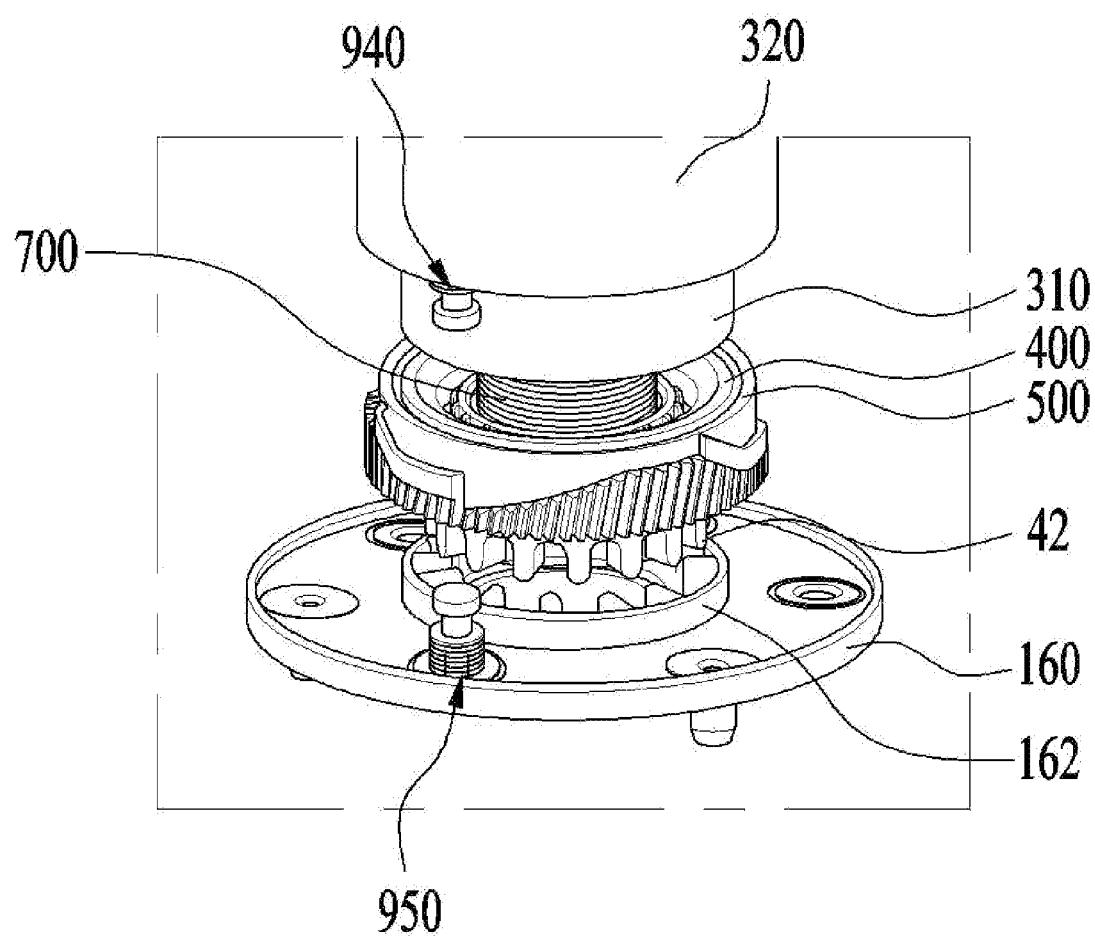
FIG. 15 is a diagram illustrating an exemplary sensor unit of the laundry treatment apparatus.

FIG. 15 is a diagram illustrating an exemplary sensor unit.

Referring to FIG. 15, the sensor unit can be in contact with at least one of the upper end and the lower end of the moving unit 500 or the coupler 400.

As a result, the sensor unit 900 can accurately detect that the coupler 400 or the moving unit 500 is located at a high point or a low point.

For example, the sensor unit 900 can be implemented as a plurality of sensor units 900 so that the sensor units 900 can contact and sense both the upper end and the lower end of the moving unit 500 or the coupler 400.

The sensor unit 900 can include a first sensor unit 940 coupled to the housing 300, and a second sensor unit 950 coupled to the driver 100.

The first sensor unit 940 can protrude from the bottom surface of the guide housing 310 or on the bottom surface of the gear housing 320 to directly contact the moving unit 500 or the coupler 400.

The second sensor unit 950 can protrude from a top surface of the rotor 120 or the bushing unit 160 to directly contact the moving unit 500 or the coupler 400.

As a result, when the moving unit 500 or the coupler 400 is in contact with the first sensor unit 940, the sensor unit 940 can accurately detect that the moving unit 500 is located at the high point and the coupler 400 is separated from the driver 100.

In addition, when the moving unit 500 or the coupler 400 is in contact with the second sensor unit 950, the second sensor unit 950 can accurately detect that the moving unit 500 is located at a low point and the housing 300 is coupled to the driver by a coupling between the coupler 400 and the driver 100.

Each of the first sensor unit 940 and the second sensor unit 950 can be provided as a contact sensor or a switch.

FIG. 16 is a diagram illustrating another exemplary sensor unit.

Referring to FIG. 16, the sensor unit 900 can be implemented as a plurality of sensor units 900 so that the sensor units 900 can contact and sense both the upper end and the lower end of the moving unit 500 or the coupler 400.

In some implementations, since the moving unit 500 or the coupler 400 is disposed in the case 600, the sensor unit 900 disposed in the case 600 can more easily contact the moving unit 500 and the coupler 400.

Accordingly, the sensor unit 900 can include a first sensor unit 940 coupled to the upper cover 660 and a second sensor unit 950 coupled to the case 600.

The first sensor unit 940 can pass through the upper body to contact the moving unit 500 or the coupler 400.

The upper body can include a sensor installation unit 664 to which the first sensor unit 940 can be fixed.

The second sensor unit 950 can protrude from a top surface of the seating body 624 to be in direct contact with the moving unit 500 or the coupler 400.

As a result, when the moving unit 500 or the coupler 400 is in contact with the first sensor unit 940, the first sensor unit 940 can accurately detect that the moving unit 500 is located at a high point and the coupler 400 is spaced apart from the driver 100.

In addition, when the moving unit 500 or the coupler 400 is in contact with the second sensor unit 950, the second sensor unit 950 can accurately detect that the moving unit 500 is located at a low point and the housing 300 is coupled to the driver by coupling between the coupler 400 and the driver 100.

Each of the first sensor unit 940 and the second sensor unit 950 can be implemented as a contact sensor or a switch.

FIGS. 17A and 17B are diagrams illustrating another exemplary sensor unit shown in FIG. 13.

Referring to FIG. 17A, the moving unit 500 can further include a first contact unit 541 and a low-point contact unit 545 disposed above the first contact unit 541.

When the moving unit 500 ascends or descends, the sensor unit 900 can allow the first contact unit 541 to be in contact with the low-point contact unit 545.

When the moving unit 500 is at a high point or a low point, the sensor unit 900 can be pressed while contacting each of the first contact unit 541 and the low-point contact unit 545, so that the sensor unit 900 can generate the ON signal.

In addition, when the moving unit 500 is disposed between the high point and the low point, the sensor unit 900 can be separated from the first contact unit 541 and the low-point contact unit 545, so that the sensor unit 900 can generate the OFF signal.

When the moving unit 500 is disposed at a lower portion, the low-point contact unit 545 can press the sensor unit 900. The low-point contact unit 545 can protrude from the upper end of the outer circumferential surface of the movable body 510.

The low-point contact unit 545 can have a ring shape at an upper end of the movable body 510, and the first contact unit 541 can have a ring shape at a middle or lower end of the movable body 510.

As a result, the sensor unit 900 can sense the position of the moving unit 500 while being in contact with the low-point contact unit 545 and the first contact unit 541.

As shown in FIG. 17A, when the moving unit 500 is located at a low point, the low-point contact unit 545 can be disposed at a position where the low-point contact unit 545 can contact the sensor unit 900.

Therefore, the sensor unit 900 can be pressed to transmit the ON signal to the controller, and the controller can recognize that the moving unit 500 is located at the low point.

When the moving unit 500 ascends, the sensor unit 900 can be separated from the low-point contact unit 545 and can also be separated from the first contact unit 541.

The sensor unit 900 can transmit the OFF signal to the controller. Therefore, the controller can recognize ascending of the moving unit.

As shown in FIG. 17B, when the moving unit 500 is located at a high point, the sensor unit 900 can be in contact with the first contact unit 541. The sensor unit 900 can be pressed to transmit the ON signal to the controller, and the controller can recognize that the moving unit 500 is located at a high point.

If the moving unit 500 again descends, the sensor unit 900 can be separated from each of the low-point contact unit 545 and the first contact unit 541. The sensor unit 900 can generate the OFF signal in the controller, so that the controller can recognize descending of the moving unit.

In some implementations, from the viewpoint of the controller, it may be impossible for the controller to distinguish whether the ON signal from among the repeatedly received ON/OFF signals is a high-point signal indicating that the moving unit 500 is at a high point or is a low-point signal indicating that the moving unit 500 is at a low point.

Therefore, assuming that an initial state is determined to be a high point and a low point, and a specific point where the controller transitions from the OFF signal to the ON signal is set to a low point or a high point, the controller can distinguish which one of the high point and the low point of the moving unit 500 is used as a subsequent ON signal to be used in future.

As a result, the accuracy of the sensor unit 900 can greatly increase as compared to the case in which the sensor unit 900 senses the position of the moving unit 500 or the coupler 400 by contacting the actuator 800.

Figure 18:
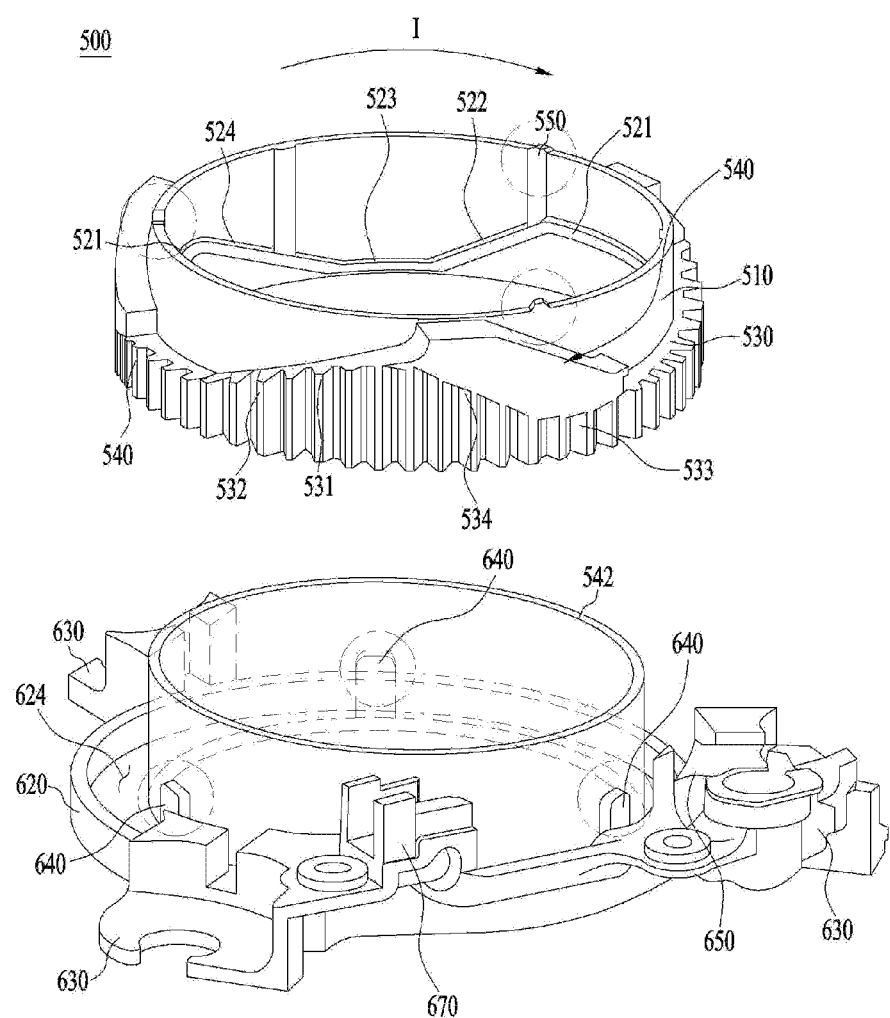
FIG. 18 is a diagram illustrating an exemplary clutch structure of the laundry treatment apparatus.

FIG. 18 is a diagram illustrating another exemplary moving unit and case.

Referring to FIG. 18, the case 600 can include a seating body 624 extending from the lower end of the receiving body 610 to receive and support the movable body 510, and an outer body 620 extending in parallel to the receiving body 610 within the seating body 624.

As a result, the movable body 510 can be disposed between the outer body 620 and the receiving body 610, so that the movable body 510 can stably rotate between the outer body 620 and the receiving body 610.

The case 600 can include an installation unit 650 disposed outside the receiving body 610 and separated from the coupling unit 630 so that the actuator 800 and the sensor unit 900 can be seated in the installation unit 650.

The installation unit can include a motor installation unit 650 separated from the coupling unit 630 so that the actuator 800 is seated therein, and a sensor installation unit 670 spaced apart from the motor installation unit 650 so that the sensor unit 900 can be seated in the sensor installation unit 670.

As a result, the actuator 800 and the sensor unit 900 can be spaced apart from each other in the case 600. The sensor unit 900 can be controlled independently of the actuator 800, and can be provided to directly sense the position of the moving unit 500.

The case 600 can be coupled to the driver 100 to rotatably accommodate the moving unit 500. The case 600 can be provided to elevate the moving unit 500 when the moving unit 500 rotates.

At least a portion of the elevation guide unit 520 of the moving unit 500 can extend along the circumference of the movable body 510.

The elevation guide unit 520 can protrude from the movable body 510 or can be recessed, so that a step difference can occur in a lower portion of the movable body 510 and the elevation guide unit 520 can be supported by the elevation rib 640.

For example, the elevation guide unit 520 can have a rib shape protruding from the inner circumferential surface of the movable body 510.

The elevation guide unit 520 can include an elevation support 522 and a descending support 524. The elevation support 522 can extend to be tilted in a downward direction from the upper portion to the lower portion thereof along the rotational direction of the movable body 510 at one surface or the inner circumferential surface of the movable body 510. The descending support 524 can extend to be tilted in an upward direction from the lower portion to the upper portion thereof along the rotational direction of the movable body at one surface or the inner circumferential surface of the movable body 510.

The elevation ribs 640 can be spaced apart from each other at intervals of a predetermined distance along the circumference of the receiving body 610. The elevation support 522 and the descending support 524 can be provided to correspond to a number of elevation ribs 640 and an arrangement of the elevation ribs 640.

The plurality of elevation ribs 640 can be formed to have the same height. The plurality of elevation ribs 640 can be spaced apart from each other at the same angle with respect to the receiving body 610 so that the elevation ribs 640 can support the moving unit 500 not to be tilted. The elevation support 522 and the descending support 524 can also be arranged to correspond in number to the elevation ribs 640, so that the moving unit 500 can ascend without being tilted.

When the elevation support 522 is supported by the receiving ribs 640 and slides, the movable body 510 can be elevated. In addition, the movable body 510 can descend when the descending support 524 is supported by the receiving rib 640 and slides.

The elevation guide unit 520 can further include a low-point support 521 disposed between a lower portion of the elevation support 522 and the descending support 524 to maintain the height of the movable body for a predetermined time, and a high-point support 523 disposed between the upper portion of the elevation support 522 and the upper portion of the descending support 524 to maintain the height of the movable body 510 for a predetermined time.

When the receiving rib 640 is supported by the low-point support 521, the movable body 510 can remain in a descended state, and when the receiving rib 640 is supported by the high-point support 523, the movable body 510 can remain in an ascending state.

The low-point support 521 can extend by a predetermined distance or more in parallel to the ground, so that the elevation state of the movable body 510 can be stably maintained. The coupler 400 can be elevated together with the movable body 510 to interconnect the housing 300 and the driver 100.

The high-point support 523 can be longer in length than the low-point support 521. As a result, the state in which the moving unit 500 is stably elevated can be maintained.

Each of the low-point support 521, the elevation support 522, the high-point support 523, and the descending support 524 can protrude from the inner circumferential surface of the movable body 510 in a rib shape.

In some implementations, the moving unit 500 can further include a coupler support 550 for supporting the coupler 400. The coupler support 550 can protrude from the upper portion of the movable body 510, and can have a rib shape extending upward from the elevation guide unit 520.

The coupler support 550 can protrude farther than the upper end of the movable body 510 to support the coupler 400. The coupler supports 550 can be spaced apart from each other along the circumference of the movable body 510 to block the coupler 400 from being tilted.

The moving unit 500 can further include gear teeth 530 engaged with the actuator at one surface of the movable body to rotate the movable body 510.

Since the actuator 800 is seated in the motor installation unit 650 and the installation height is fixed, the width or height of the gear teeth 530 can vary along the circumference of the movable body 510 in a manner that the gear teeth 530 can be continuously engaged with the actuator 800 irrespective of the elevation of the movable body 510.

The gear teeth 530 can be provided such that the width or the height thereof can increase at a point corresponding to the elevation support 522 and the low-point support 521, and can be provided such that the width or the height thereof can decrease at a point corresponding to the descending support 524 and the high-point support 523.

As a result, the gear teeth 530 can remain engaged with the actuator 800 regardless of the elevation of the moving unit 500.

The gear teeth 530 can be provided in a serrated shape formed at the outer surface of the contact unit 540 or a surface of the contact unit 540.

The contact unit 540 can be provided to be in contact with the sensor unit 900 when the movable body 510 ascends from the case 600, and can be separated from the sensor unit 900 when the movable body 510 descends from the case 600.

The contact unit 540 can protrude from the outer surface of the movable body 510 to be selectively in contact with the sensor unit 900. The moving unit 500 can serve not only as a power transmission part for elevating the coupler 400, but also as a cam contacting the sensor unit.

Figure 19A:
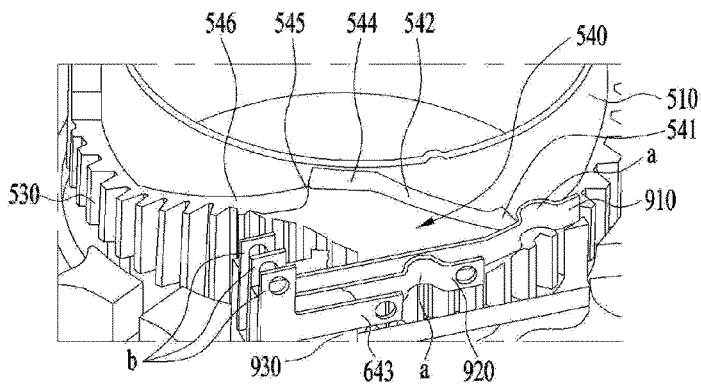
FIGS. 19A to 19C are diagrams illustrating an exemplary method for operating the moving unit and the sensor unit for use in the clutch structure shown in FIG. 8.
Figure 19B:
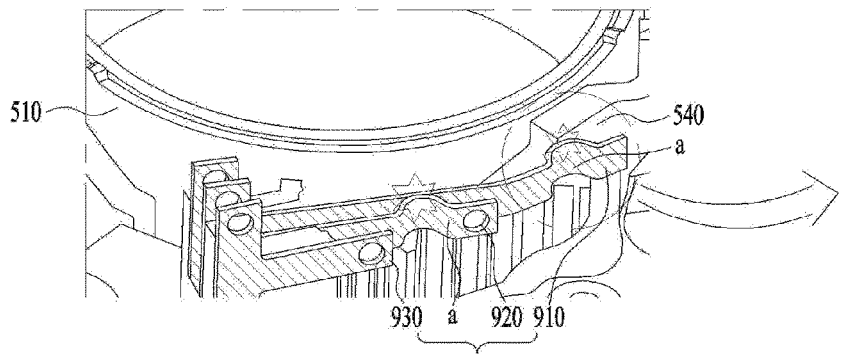
Figure 19C:
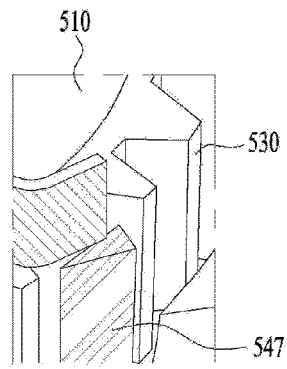

FIGS. 19A, 19B, and 19C are diagrams illustrating a structure of the sensor unit that can be applied to the clutch unit of FIG. 18.

Referring to FIG. 19A, the contact unit 540 can include a first contact unit 541 protruding from the outer circumferential surface of the movable body 510 and contacting the sensor unit when the movable body 510 is at a high point, and a third contact unit 544 spaced apart from the first contact unit 541 in the circumferential direction of the movable body so that the third contact unit 544 is separated from the sensor unit 900 when the movable body 510 descends to a specific height or less.

The contact unit 540 can be disposed above the gear teeth 530.

In some implementations, the contact unit 540 can include a second contact unit 542 extending obliquely from the first contact unit 541 toward the third contact unit 544, and a descending contact unit 546 extending obliquely from the third contact unit 544 toward the gear teeth 530.

As the second contact unit 542 extends farther from the first contact unit 541 toward the third contact unit 544, the width of the second contact unit 542 can increase. The slope formed by the upper end of the second contact unit 542 can be a slope corresponding to the descending support 524.

The descending contact unit 546 can extend from the third contact unit 544 toward the gear teeth 530. The descending contact unit 546 may not be in contact with the sensor unit 900.

When the sensor unit 900 contacts the first contact unit 541, the second contact unit 542 can be provided such that the sensor unit 900 remains in contact with the contact unit 540 when the moving unit 500 descends.

The third contact unit 544 can be provided to maintain a pressurized state of the sensor unit 900 until the movable body 510 descends to a specific height. In addition, the third contact unit 544 can be spaced apart from the sensor unit 900 when the movable body 510 descends to the specific height or less.

The specific height can be a height at which the coupler 400 starts to be coupled to the rotor 120.

When the sensor unit 900 is in contact with the contact unit 540, the sensor unit 900 can sense that the housing 300 and the driver 100 are separated from each other by the coupler 400.

Accordingly, the controller of the laundry treatment apparatus can independently rotate the drum 30 and the agitator 40 in the washing and rinsing processes except for the dehydration process.

When the sensor unit 900 is spaced apart from the contact unit 540, the sensor unit 900 can sense that the housing 300 and the driver 100 are coupled to each other by the coupler 400.

As a result, the controller of the laundry treatment apparatus can simultaneously rotate the drum 30 and the agitator 40 in the washing, rinsing, and dehydration processes.

In some implementations, the contact unit 540 can be provided to interconnect the third contact unit 544 and the descending contact unit 546, and can further include a step contact unit 545 extending along a steeper slope than the descending contact unit 546. The step contact unit 545 can be provided to rapidly separate the contact unit 540 and the sensor unit 900 from each other.

The sensor unit 900 can quickly transition to the OFF signal so that the sensor unit 900 can quickly recognize that the rotor 120 and the housing 300 are coupled to each other by the coupler 400.

The sensor unit 900 can include contact terminals 910, 920, and 930 that are seated in the sensor installation unit 670 and extend to the outer circumferential surface of the moving unit 500.

The contact terminals 910, 920, and 930 can be made of a metal material to allow electrical signals to be transmitted. The contact terminals 910, 920, and 930 can extend from the sensor installation unit 670 toward the outer circumferential surface of the movable body 510.

The contact terminals 910, 920, and 930 can be provided to contact the contact unit 540, and can be spaced apart from the outer circumferential surface of the movable body 510.

The contact terminals 910, 920, and 930 can have a plate shape extending from the terminal coupling unit, which is coupled to and fixed to the sensor installation unit 670, toward the contact unit 540.

The contact terminals 910, 920, and 930 can include a contact guide unit (a) that is bent from the one surface toward the contact unit 540 to further guide contact with the contact unit 540.

The contact terminals 910, 920, and 930 can include a first terminal 910 coupled to the sensor installation unit 670 to be bent toward the outside of the case 600 when the contact unit 540 is in contact with the contact unit 540, and a second terminal 920 spaced apart from the first terminal 910 toward the outside of the case 600 to be in contact with the first terminal 910 when the first terminal 910 is bent toward the outside of the case 600.

In some implementations, the first terminal 910 can be longer than the second terminal 920, and the first terminal 910 can have a longer bending length than the second terminal 920.

Referring to FIG. 19B, when the first terminal 910 contacts the contact unit 540, the first terminal 910 is bent toward the second terminal 920, and the first terminal 910 and the second terminal 920 are in contact with each other.

As a result, the sensor unit 900 can sense that the first terminal 910 and the second terminal 920 are electrically connected or an electric signal is transmitted, so that the sensor unit 900 can recognize contact between the first terminal 910 and the contact unit 540.

When the contact guide unit (a) of the first terminal 910 is in contact with the contact unit 540, the contact guide unit (a) of the second terminal 920 can be designed to be in contact with the first terminal 641.

The position of the contact guide unit (a) of the second terminal 920 can be spaced apart from the contact guide unit (a) of the first terminal 910.

Referring to FIG. 19A, the first terminal 910 can contact a portion of the first contact unit 541, a portion of the second contact unit 542, and the third contact unit 544, but at least a portion of the descending contact unit 546 and the gear teeth 530 can be spaced apart from each other.

When the moving unit 500 is disposed at the low point, the sensor unit 900 may not yet contact the first terminal 641.

As the moving unit 500 rotates, the first contact unit 541 can gradually move toward the first terminal 910. As a result, the first terminal 910 can be in contact with the first contact unit 541 and can be bent toward the second terminal 920. For example, the contact guide unit (a) of the first terminal 910 is in contact with the first contact unit 541, and moves along the first contact unit 541 and is gradually pressurized and bent toward the second terminal 920 so that the contact guide unit (a) can contact the second terminal 920.

As a result, the sensor unit 900 can recognize that the moving unit 500 ascends to a high point.

Referring to FIG. 19B, when the moving unit 500 descends and the contact guide unit (a) of the first terminal 910 reaches the third contact unit 544, the first terminal 910 remains bent toward the second terminal 920, so that the second terminal 920 can maintain contact with the first terminal 910.

Until this time, the contact guide unit (a) of the second terminal 920 can be in contact with the first terminal 910. As a result, the current can flow between the first terminal 910 and the second terminal 920, and the sensor unit 900 can recognize that the coupler 400 is descending until just before the coupler 400 is coupled to the driver 100 after the moving unit 500 reaches a high point.

In some implementations, the sensor unit 900 can further include a third terminal 930 spaced apart from the second terminal 920 toward the outside of the case 600.

The third terminal 930 can be provided to transmit or receive electricity to or from each of the first terminal 910 and the second terminal 920, and the electrical signal transmitted to the third terminal 930 can be transferred to the entire sensor unit 900 when the first terminal 910 and the second terminal 920 are in contact with each other.

Accordingly, the sensor unit 900 can accurately recognize, in a physical manner, whether the moving unit 500 ascends.

Referring to FIG. 19C, the first terminal 910 is longer in length than the second terminal 920, so that the free end of the first terminal 910 may be tilted downward by a weight of the first terminal 910.

To prevent this, the case 600 can further include a terminal support 547 that supports a lower portion of the free end of the first terminal 910. The terminal support 547 can be disposed so as not to interfere with the moving unit 500.

In some implementations, the sensor unit 900 can also be implemented as the sensor units shown in FIGS. 15 to 17B without any problems.

Figure 20A:
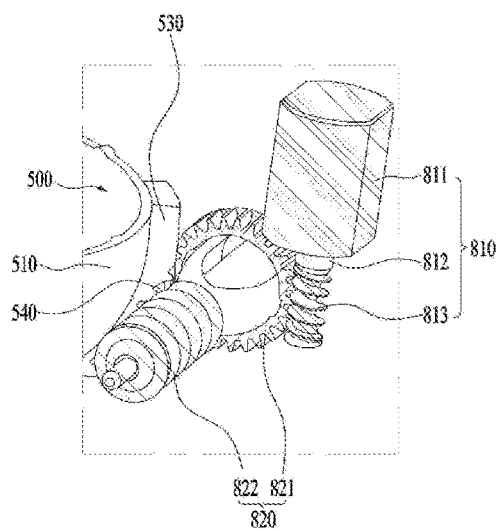
FIGS. 20A and 20B are diagrams illustrating an exemplary actuator for use in the clutch structure of the laundry treatment apparatus.
Figure 20B:
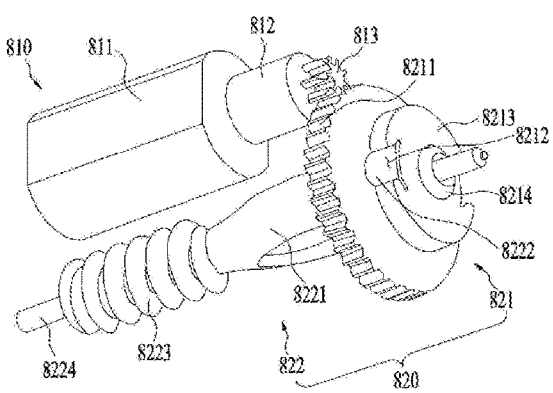

FIGS. 20A and 20B are diagrams illustrating an exemplary actuator of the laundry treatment apparatus.

Referring to FIG. 20A, the actuator 800 can include a power generation unit 810 seated in the case, and a transfer unit 820 engaged with the power generation unit 810 and the moving unit 500 to rotate the moving unit 500.

The power generation unit 810 can include a drive motor 811 for generating power to rotate the moving unit 500, and a power shaft 812 rotating by the drive motor 811.

The transfer unit 820 can be seated in the motor installation unit 650 so that the transmission gear 822 can be engaged with the gear teeth 530 of the moving unit 500, and the power generation unit 810 can be coupled to at least one of the case 600 or the upper cover 660 to be engaged with the transfer unit 820.

The power shaft 812 can be provided to rotate the moving unit 500 by engaging with the gear teeth 530 of the moving unit 500. In some implementations, even though the output of the power generation unit 810 is sufficient, the power shaft 812 can be smaller in diameter than the gear teeth 530 of the moving unit 500, and thus torque required to elevate he moving unit 500 may be insufficient.

To this end, whereas the transfer unit 820 rotates at a lower rpm than the power shaft 812, the transfer unit 820 can further increase torque. The transfer unit 820 can be engaged with the power shaft 812 and the moving unit 500, and can have a larger diameter than the power shaft 812.

The power shaft 812 can further include a shaft gear 813 engaged with the transfer unit 820. The shaft gear 813 can be provided as a worm gear formed in a screw shape in a longitudinal direction of the power shaft 812. As a result, the output generated by the power shaft 812 can be transmitted to the transfer unit 820 with high torque.

The transfer unit 820 can include a transfer body 821 that rotates in engagement with the drive motor. The transfer body 821 can have a cylindrical shape and can include a shaft coupling unit 8211 engaged with the power shaft 812 at the outer circumferential surface thereof.

The shaft coupling unit 8211 can be provided as a serration that rotates by engaging with the shaft gear 813.

The transfer body 821 can be directly engaged with the moving unit 500 to rotate the moving unit 500. In some implementations, in order to transfer greater torque to the moving unit 500, the transfer unit 820 can further include a transmission gear 822 coupled to the transfer body 821 to rotate the moving unit 500.

The transmission gear 822 can be provided as a worm gear rotating in contact with one surface of the moving unit 500.

Accordingly, power generated by the power generation unit 810 can be further amplified and transmitted to the gear teeth 530 of the moving unit 500 to overcome the load of the moving unit 500, so that the moving unit 500 can ascend and rotate.

In some implementations, the power generation unit 810 can directly contact the gear teeth 530 of the moving unit 500, thereby rotating and elevating the moving unit 500.

The transfer unit 820 can be disposed in a tangential direction of the movable body 510 and can be disposed parallel to the bottom surface of the movable body 510. The power generation unit 810 can be disposed in a height direction of the movable body 510.

As a result, the power generation unit 810 and the transfer unit 820 can be installed in different directions, thereby increasing the degree of freedom in installation of the actuator 800.

Referring to FIG. 20B, the power generation unit 810 and the transfer unit 820 can also be arranged parallel to each other. As a result, the total volume occupied by the actuator 800 can be reduced as much as possible.

In some implementations, when the moving unit 500 is restrained and switches to a state in which the moving unit 500 cannot rotate, the actuator 800 may be damaged. For example, the power generation unit 810 can rotate the power shaft 812, but the moving unit 500 may be restrained to the housing 300 or the like so that there may occur a state in which the moving unit 500 cannot rotate.

In this case, when the power shaft 812 is also restrained, the power generation unit 810 may be damaged. To prevent this, the transmission gear 822 can be detachably provided in the transfer body 821.

Figures 21A, 21B:
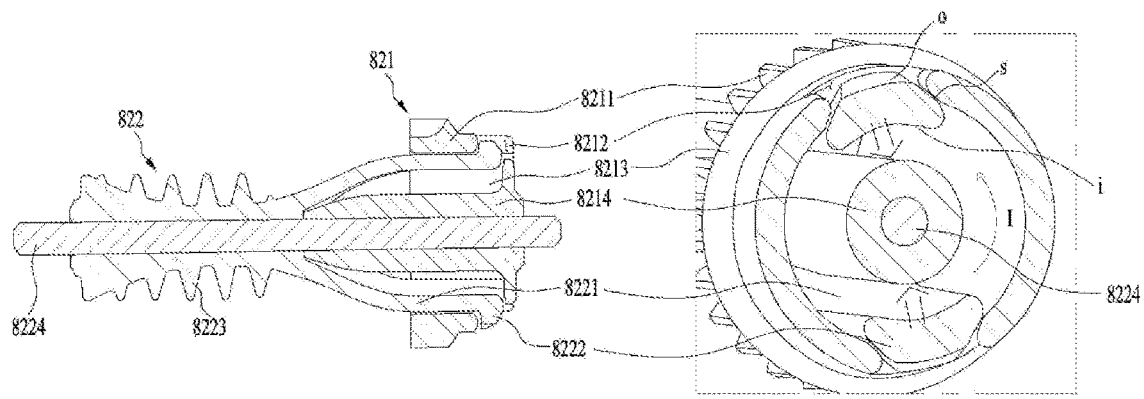
FIGS. 21A and 21B are diagrams illustrating an exemplary actuator for reducing damages to the actuator.

FIGS. 21A and 21B are diagrams illustrating an exemplary actuator for reducing damages to the actuator.

Referring to FIGS. 21A and 21B, the transmission gear 833 can be coupled to the transfer body 821 so that, when the moving unit 500 is restrained, the transfer body 821 can be repeatedly separated from and coupled to the transfer body 821.

For example, when the moving unit 500 is restrained, the transfer body 821 can freely rotate around the transmission gear 822 to prevent the power generation unit 810 from being restrained.

Referring to FIG. 21A, the transfer body 821 can include a shaft coupling unit 8211 that rotates by engaging with the shaft gear 813, a coupling groove 8212 disposed in the shaft coupling unit 8211 so as to be detachably coupled to the transmission gear 822, a receiving body 8213 forming the main body of the transfer body 821 to receive a portion of the transmission gear 822, and a shaft support 8214 for supporting the gear shaft 8224 of the transmission gear 822.

The transmission gear 822 can include a gear shaft 8224 forming a center of rotation (hereinafter referred to as a rotation center), a worm gear 8223 accommodating the gear shaft 8224 and engaged with the gear teeth 530 of the moving unit 500, and a coupling hook 8222 extending from the worm gear 8223 to the coupling groove 8212 and detachably coupled to the coupling groove 8212.

The coupling hook 8222 can be implemented as a plurality of coupling hooks 8222 extending from one end of the worm gear 8223 toward the transfer body 821, so that the coupling hooks 8222 can be provided symmetrical to the gear shaft 8224.

The coupling hooks 8222 can be detachably provided in the coupling grooves 8212 from the inside of the receiving body 8213, and the end of each coupling hook 8222 can be formed in a hook shape to be inserted into the coupling groove 8212.

The coupling hook 8222 can be provided to have elasticity toward the outer circumferential surface of the transfer body 821. As a result, the coupling hook 8222 becomes closer to the transfer body 821 while being inserted into the transfer body 821, and can be coupled to the coupling groove 8212.

Referring to FIG. 21B, the end of the coupling hook 8222 can be provided such that the outer surface (o) of the coupling hook 8222 is shorter in diameter than the inner surface (i) and the outer surface (o) is provided as a curved surface. The outer surface (o) can slide along the inner circumferential surface of the receiving body 8213.

The side surface (s) of the coupling hook 8222 can be provided as a sliding surface to slide on the inner surface of the coupling groove 8212. The side surface (s) can be formed in a convex curved shape from the outer surface (o) toward the inner surface (i).

When the transfer body 821 rotates in the direction (I) and the worm gear 8223 does not rotate, the coupling hook 8222 can move toward the gear shaft 8224 to be separated from the coupling groove 8212.

Then, when the transfer body 821 continuously rotates by the power generation unit 810, the outer surface (o) of the coupling hook 8222 can slide along the inner circumferential surface of the transfer body 821 and can again be inserted into and coupled to the coupling groove 8212 when the coupling hook 8222 is disposed to face the coupling groove 8212.

If the moving unit 500 is restrained, the coupling hook 8222 can move toward the gear shaft 8224, can again deviate from the coupling groove 8212, and the above-described process can be repeatedly performed.

As a result, the transfer body 821 can freely rotate regardless of movement of the transmission gear 822, thereby reducing damages to the power generation unit 810.

Figures 22A, 22B, 22C:
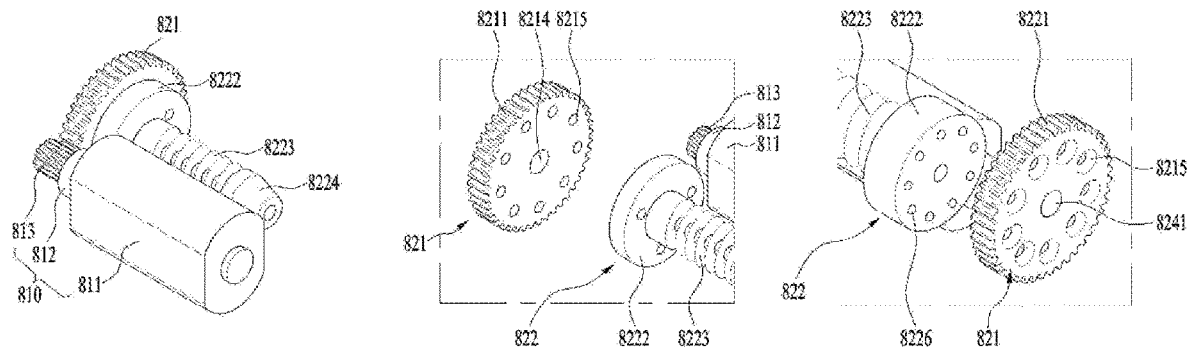
FIGS. 22A to 22C are diagrams illustrating another exemplary actuator for reducing damages to the actuator.

FIGS. 22A, 22B, and 22C are diagrams illustrating another exemplary actuator for reducing damages to the actuator.

Referring to FIG. 22A, the actuator 800 can include the power generation unit 810 for generating power or rotational force for elevating the moving unit, and a transfer unit 820 configured to rotate by the power generating unit 810.

The transfer unit 820 can be provided to rotate by the actuator 800 to serve as an intermediary for rotating the moving unit 500.

The power generation unit 810 can include a drive motor 811 to generate power for rotating the moving unit 500, a power shaft 812 rotated by the drive motor 811, and a shaft gear 813 provided on the outer circumferential surface of the power shaft 812.

The transfer unit 820 can include a transfer body 821 to rotate by engaging with the shaft gear 813, and a transmission gear 822 coupled to the transfer body and configured to rotate by engaging with the moving unit.

The transfer body 821 can have a larger diameter than the power shaft 812 or the shaft gear 813. In addition, the transmission gear 822 can have a smaller diameter than the transfer body 821.

Thus, the transmission gear 822 can rotate at a lower rpm than the power shaft 812, and can generate greater torque than the power shaft 812.

The transmission gear 822 can be detachably coupled to the transfer body 821. Accordingly, when the moving unit 500 is restrained or the transmission gear 822 is restrained in rotation, the transfer body 821 can rotate independently of the transmission gear 822, thereby blocking excessive load from being applied to the drive motor 811. As a result, damages to the power generation unit 810 can be reduced.

The transmission gear 822 can include a coupling hook 8222 detachably disposed in the transfer body 821, and a gear shaft 8224 extending from the coupling hook 8222.

The coupling hook 8222 can have a disc shape, and can be provided to face and couple to the transfer body 821.

The gear shaft 8224 can rotate with the coupling hook 8222 so that the outer circumferential surface thereof can be engaged with the gear teeth 530 of the moving unit. A worm gear 8223 or a serration can be provided on the outer circumferential surface of the gear shaft 8224 to rotate the gear teeth 530.

Referring to FIG. 22B, the transfer body 821 can include a shaft coupling unit 8211 that is formed in a disc shape and rotates in engagement with the shaft gear 813 on an outer circumferential surface thereof. The shaft coupling unit 8211 can be provided as a serration.

The transfer body 921 can include a shaft support 8214 for supporting the gear shaft 8224 at the center thereof. The shaft support 8214 can serve as a center of rotation of the gear shaft 8224.

The transfer body 821 can include a detachable unit 8215 detachably coupled to a portion of the transmission gear 822. The detachable unit 8215 can pass through the transfer body 821 so that a portion of the transmission gear 822 can be inserted thereinto, or can be inserted into the transmission gear 822 while protruding from the transfer body 821.

For example, the transfer body 821 can be detachably coupled to the transmission gear 822 through the detachable unit 8215.

The detachable unit 8215 can be implemented as a plurality of detachable units 8215 spaced apart from each other at a predetermined angle with respect to the shaft support 8214, and can be spaced apart from the shaft support 8214 by the same distance.

Referring to FIG. 22C, the transmission gear 822 can include a fastening unit 8226 detachably coupled to the detachable unit 8215. The fastening unit 8226 can be inserted into the detachable unit 8215 or can be provided to receive the detachable unit 8215.

The fastening units 8226 can be provided corresponding in number to the detachable units 8215, or the number of fastening units 8216 can be less than the number of detachable units 8215. In addition or alternatively, only one fastening unit 8216 can be provided.

When the plurality of fastening units 8226 are provided, the fastening units 8226 can be spaced apart from each other at the same interval.

When the detachable unit 8215 is formed as a through-hole, the fastening unit 8226 can be formed in a protrusion shape that can be inserted into the detachable unit 8215.

When the moving unit 500 or the transfer unit 820 is not restrained, the fastening unit 8226 and the detachable unit 8215 can be coupled to each other and then rotate by the drive motor 811.

In some implementations, when threshold torsional external force is applied to the fastening unit 8226 and the detachable unit 8215, the fastening unit 8226 and the detachable unit 8215 can be separated from each other.

For example, when the moving unit 500 or the transfer unit 820 is restrained and the moving unit 500 does not rotate in response to movement of the power generation unit 810, this means that limit torsional external force occurs between the fastening unit 8226 and the detachable unit 8215. In this case, the detachable unit 8215 may repeat a series of operations in which the detachable unit 8215 rotates after being separated from the fastening unit 8226 and is then coupled to the fastening unit 8226.

As a result, the power generation unit 810 can be prevented from being restrained.

Figure 23:
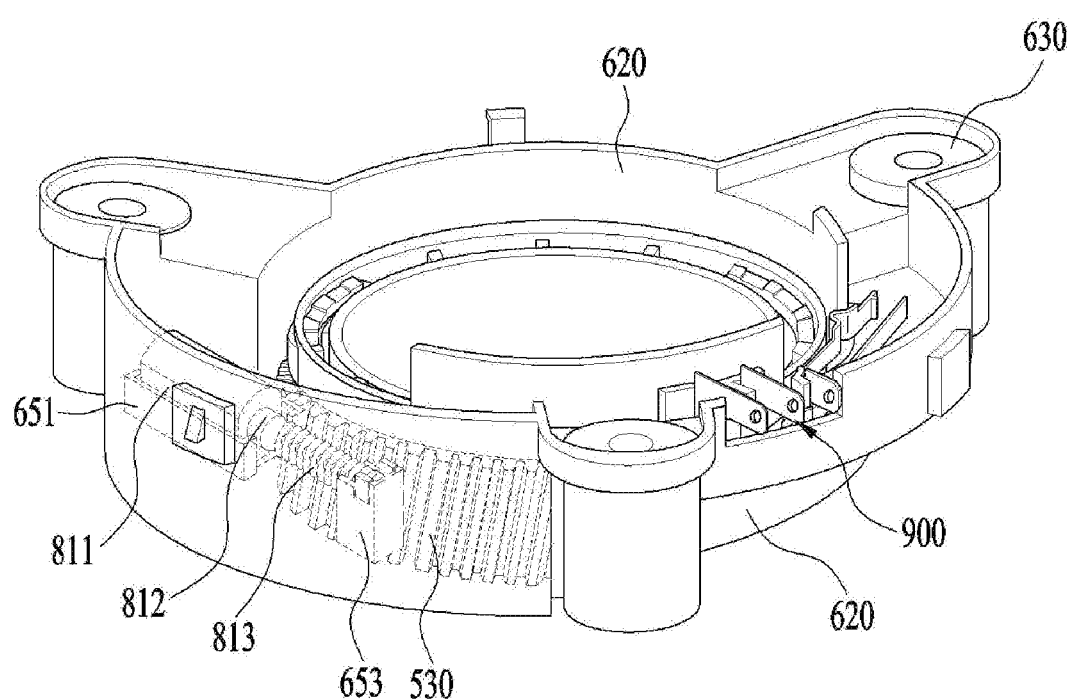
FIG. 23 is a diagram illustrating another exemplary actuator for use in the clutch structure of the laundry treatment.

FIG. 23 is a diagram illustrating another exemplary actuator for use in the clutch structure of the laundry treatment apparatus.

In the following description, a description of the same structures as described above will be omitted and only the remaining parts different from those of the above-described embodiments will hereinafter be described for convenience of description.

The actuator 800 can be provided to directly rotate the moving unit 500.

The actuator 800 can be disposed in the driver 100 to be in direct contact with the moving unit 500. An intermediary unit configured to rotate separately between the actuator 800 and the moving unit 500 may be omitted.

Specifically, the actuator 800 can include a drive motor 811 for generating the rotational force of the moving unit 500, and a power shaft 812 rotating by the drive motor.

The power shaft 812 can be in direct contact with the moving unit 500 to rotate the moving unit 500. Therefore, in this case, the actuator 800 can transfer the rotational energy to the moving unit 500 without converting the rotational energy into rectilinear motion or reciprocating motion.

The moving unit 500 can include gear teeth 530 that rotate by engaging with the power shaft 812 along the outer circumferential surface thereof. The power shaft 812 can include a shaft gear 813 disposed on the outer circumferential surface thereof to be engaged with the gear teeth 530.

The shaft gear 813 can be provided on the outer circumferential surface of the power shaft 812, and can have a predetermined length or more in the longitudinal direction of the power shaft 812. The shaft gear 813 can be provided as a worm gear.

Accordingly, the moving unit 500 can rotate at a lower rpm than the rpm of the shaft gear 813, and higher torque than the torque generated by the power shaft 812 can be transmitted to the moving unit 500.

The longitudinal direction of the power shaft 812 can be disposed in parallel to a tangential direction of the outer circumferential surface of the moving unit 500. In some implementations, the power shaft 812 can rotate in a state in which one surface of the power shaft 812 is in contact with a portion of the one surface of the moving unit 500.

Therefore, the power shaft 812 can rotate the moving unit 500 through the shaft gear 813 using the rotational force generated by the drive motor 811.

As a result, the clutch unit (c) of the laundry treatment apparatus may omit a separate intermediary for transmitting power, rotational power, and rotational energy generated by the actuator 800 to the moving unit 500

Therefore, the volume of the clutch unit (c) can be reduced, and the actuator 800 can be densely arranged inside the driver 100.

Figure 24:
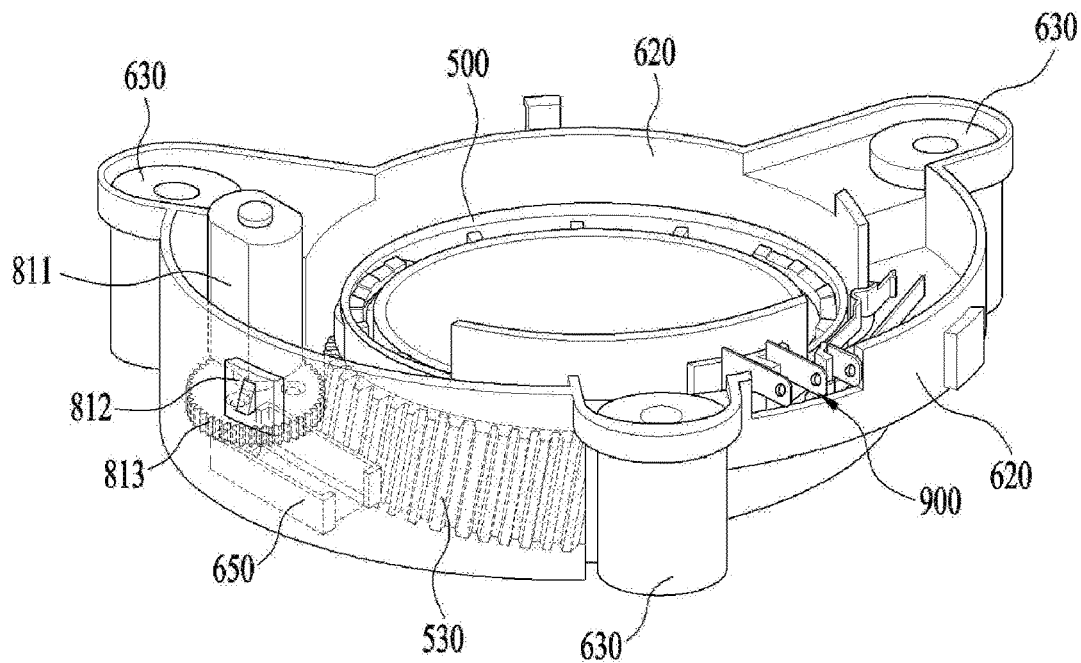
FIG. 24 is a diagram illustrating another exemplary actuator for use in the clutch structure of the laundry treatment apparatus.

FIG. 24 is a diagram illustrating another exemplary actuator for use in the clutch structure of the laundry treatment apparatus.

In the following description, a description of the same structures as described above will be omitted and only the remaining parts different from those of the above-described embodiments will hereinafter be described for convenience of description.

The drive motor 811 or the power shaft 812 can be disposed in parallel to the drive shaft 130.

The power shaft 812 can include a shaft gear 813 having a larger diameter than the power shaft 812. The shaft gear 813 can have a disc shape, and a serration capable of engaging with the gear teeth 530 of the moving unit 500 can be provided on the outer circumferential surface of the shaft gear 813.

The shaft gear 813 can have a larger diameter than the power shaft 812 to allow the power shaft 812 to be spaced apart from the moving unit 500.

Therefore, the drive motor 811 can be spaced farther from the moving unit 500 than the other case in which the power shaft 812 is in contact with the moving unit 500, and heat generated by the drive motor 811 can be more easily dissipated.

Figure 25:
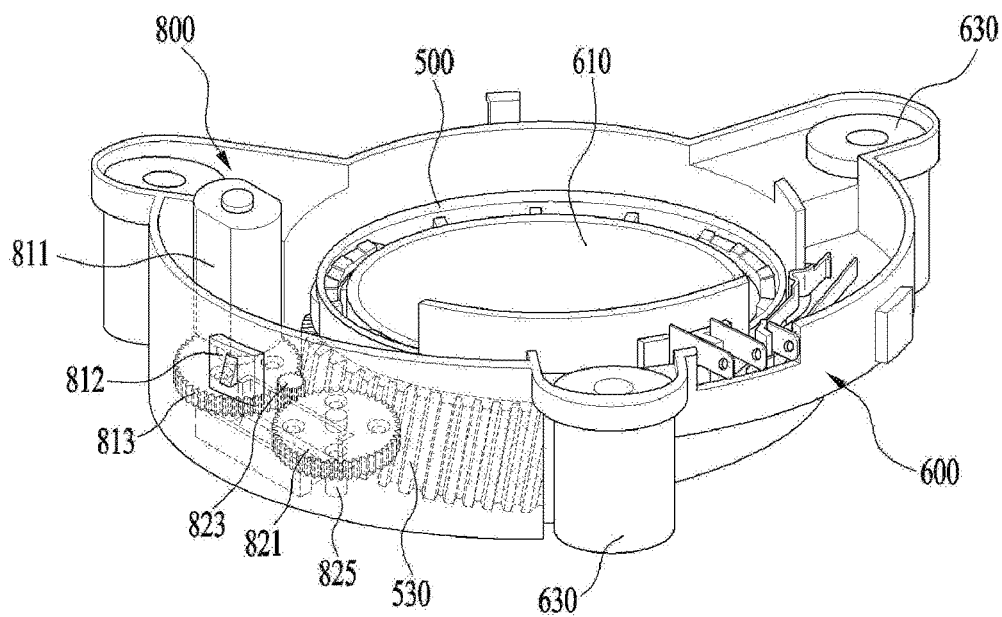
FIG. 25 is a diagram illustrating another exemplary actuator for use in the clutch structure of the laundry treatment apparatus.

FIG. 25 is a diagram illustrating another exemplary actuator for use in the clutch structure of the laundry treatment apparatus.

In the following description, a description of the same structures as described above will be omitted and only the remaining parts different from those of the above-described embodiments will hereinafter be described for convenience of description.

The clutch unit (c) can include the transfer unit 820 that is engaged with both the actuator and the moving unit 500, rotates by the actuator 800, and thus rotates the moving unit.

The actuator 800 can include a drive motor 811 for generating the rotational force, and a power shaft 812 rotated by the drive motor 811.

The transfer unit 820 can include a transfer body 821 for receiving the rotational force from the power shaft 812 to rotate the moving unit.

The transfer body 821 can be rotatably coupled to a fixing shaft 825 fixed to the case 600.

The transfer body 821 can be disposed to be engaged with the moving unit 500.

The transfer unit 820 can further include an auxiliary body 823 engaged with the power shaft 812 and the transfer body 821 to transmit power of the power shaft 812.

The auxiliary body 823 can be implemented as a gear formed in a disc shape.

The auxiliary body 823 can be smaller in diameter than the transfer body 821.

The power shaft 812 can include a shaft gear 813 provided as a disc-shaped gear. In this case, the auxiliary body 823 can be engaged with both the shaft gear 813 and the transfer body 821.

The auxiliary body 823 can be implemented as a plurality of auxiliary bodies 823 so that the auxiliary bodies 823 can be engaged with each other. Although the actuator 800 is spaced apart from the moving unit 500, the rotational energy generated by the actuator 800 can be transmitted to the moving unit 500 through the transfer body 821 and the auxiliary body 823.

The actuator 800 can rotate the moving unit 500 through the auxiliary body 823 and the transfer body 821 even when the power shaft 812 and the shaft gear 813 are separated from the moving unit 500.

Therefore, the degree of freedom in installation of the actuator 800 in the case 600 becomes higher, and the rpm and torque generated by the power shaft 812 can be converted into various gear ratios through the auxiliary body 823 and the transfer body 821 and then transmitted to the moving unit 500. As a result, heat generated by the actuator 800 can be effectively dissipated, and the degree of freedom in installation of the actuator 800 may increase. In addition, a separation distance between the sensor unit 900 and the actuator 800 may further increase, so that the sensor unit 900 can be more easily installed.

As is apparent from the above description, the laundry treatment apparatus can install the actuator configured to drive the clutch using a space occupied by the driver.

The laundry treatment apparatus can install the actuator inside the driver.

The laundry treatment apparatus can guarantee a washing volume by reducing a space occupied by the actuator separately from the driver.

The laundry treatment apparatus can enable the actuator and the driver to be modularized and installed.

The laundry treatment apparatus can transmit rotational energy generated by the actuator driving the clutch to the clutch without converting the rotational energy into rectilinear motion or reciprocating rotational motion.

What is claimed is:

1. A laundry treatment apparatus comprising:
    a tub configured to receive water;
    a drum that is rotatably provided in the tub and that is configured to receive laundry;
    an agitator that is rotatably provided in the drum and that is configured to move the laundry;
    a driver that is coupled to the tub and that is configured to provide power for rotating at least one of the drum or the agitator; and a clutch unit that is provided between the driver and the agitator and that is configured to transmit the power from the driver to at least one of the drum or the agitator, wherein the clutch unit includes:
  a gear unit configured to rotate based on being engaged with the driver,
  a rotary shaft that is coupled to the gear unit and that is configured to rotate the agitator,
  a housing that is coupled to the drum and that accommodates the gear unit and the rotary shaft,
  a coupler that is configured to reciprocate between the housing and the driver and that is configured to rotate the housing,
  a moving portion that supports the coupler seated thereon to reciprocate the coupler, and
  an actuator configured to reciprocate the moving portion, wherein the laundry treatment apparatus further comprises a case that is disposed in the driver and that accommodates the moving portion to be reciprocated, and wherein the case includes:
  a receiving body that is disposed in the driver and that accommodates the moving portion or the coupler, and
  a first installation portion that is disposed at an outside of the receiving body and that is coupled to the actuator.

2. The laundry treatment apparatus according to claim 1, wherein:
  at least a portion of the actuator overlaps the driver in a direction of the rotary shaft.

3. The laundry treatment apparatus according to claim 1, wherein the driver includes:
  a stator that is coupled to the tub and that is configured to generate a rotating magnetic field,
  a rotor configured to be rotated by the stator, and
  a drive shaft configured to rotate with the rotor so as to rotate the gear unit,
  wherein at least a portion of the actuator is disposed in the stator.

4. The laundry treatment apparatus according to claim 3, wherein the stator includes:
  a core coupled to the tub and through which the drive shaft passes, and
  a fixing rib that radially extends from an outer circumferential surface of the core and that has a coil wound thereon,
  wherein at least a portion of the actuator is disposed in the core.

5. The laundry treatment apparatus according to claim 1, further comprising:
  a sensor unit configured to determine whether the coupler or the moving portion is elevated,
  wherein the sensor unit is disposed in the driver.

6. The laundry treatment apparatus according to claim 5, wherein the driver includes:
  a stator that is coupled to the tub and that is configured to generate a rotating magnetic field,
  a rotor configured to be rotated by the stator, and
  a drive shaft configured to rotate with the rotor so as to rotate the gear unit,
  wherein at least a portion of the sensor unit is disposed in the stator.

7. The laundry treatment apparatus according to claim 6, wherein the stator includes:
  a core coupled to the tub and through which the drive shaft to passes, and
  a fixing rib that radially extends from an outer circumferential surface of the core and that has a coil wound thereon,
  wherein the sensor unit is disposed in the core.

8. The laundry treatment apparatus according to claim 7, wherein:
  the moving portion or the coupler is disposed in the core, and
  the sensor unit is configured to sense a position or height of either the moving portion or the coupler.

9. The laundry treatment apparatus according to claim 8, wherein:
  the sensor unit is disposed to be spaced apart from the actuator.

10. The laundry treatment apparatus according to claim 1, wherein the actuator is disposed in the case.

11. The laundry treatment apparatus according to claim 1, further comprising:
  a sensor unit configured to sense whether the coupler or the moving portion is elevated, and
  wherein the case further includes a second installation portion that is disposed at an outside of the receiving body and that accommodates the sensor unit.

12. The laundry treatment apparatus according to claim 11, wherein:
  the first installation portion and the second installation portion are spaced apart from each other.

13. The laundry treatment apparatus according to claim 11, wherein the driver includes:
  a stator that is coupled to the tub and that is configured to generate a rotating magnetic field,
  a rotor configured to be rotated by the stator, and
  a drive shaft configured to rotate together with the rotor so as to rotate the gear unit, and
  wherein the receiving body, the first installation portion, and the second installation portion are disposed in the stator.

14. The laundry treatment apparatus according to claim 13, wherein the stator includes:
  a core coupled to the tub and through which the drive shaft passes, and
  a fixing rib that radially extends from an outer circumferential surface of the core and that has a coil wound thereon, and
  wherein the receiving body, the first installation portion, and the second installation portion are disposed in the core.

15. The laundry treatment apparatus according to claim 14, wherein the case includes:
  a plurality of coupling units that extend from the receiving body toward an inner circumferential surface of the core and that couples the receiving body to an inside of the core, and
  wherein the first installation portion and the second installation portion are disposed between the inner circumferential surface of the core and the plurality of coupling units.

16. The laundry treatment apparatus according to claim 15, wherein the plurality of coupling units include:
  a first coupling unit extending from the receiving body toward the inner circumferential surface of the core,
  a second coupling unit that is spaced apart from the first coupling unit within the receiving body and that extends to the inner circumferential surface of the core, and a third coupling unit that is spaced apart from the first coupling unit and the second coupling unit within the receiving body and that extends to the inner circumferential surface of the core, and wherein the first installation portion and the second installation portion are disposed between the first coupling unit and the second coupling unit.

17. The laundry treatment apparatus according to claim 15, wherein the plurality of coupling units include:
   a first coupling unit extending from the receiving body toward the inner circumferential surface of the core,
   a second coupling unit that is spaced apart from the first coupling unit within the receiving body and that extends to the inner circumferential surface of the core, and
   a third coupling unit that is spaced apart from the first coupling unit and the second coupling unit within the receiving body and that extends to the inner circumferential surface of the core, and
   wherein:
      the first installation portion is disposed between the first coupling unit and the second coupling unit, and
      the second installation portion is disposed between the second coupling unit and the third coupling unit.

18. The laundry treatment apparatus according to claim 15, wherein the plurality of coupling units include:
   a first coupling unit extending from the receiving body toward the inner circumferential surface of the core,
   a second coupling unit that is spaced apart from the first coupling unit within the receiving body and that extends to the inner circumferential surface of the core, and
   a third coupling unit that is spaced apart from the first coupling unit and the second coupling unit within the receiving body and that extends to the inner circumferential surface of the core,
   wherein: at least one of regions defined among the first coupling unit, the second coupling unit, the third coupling unit, and the inner circumferential surface of the core provides an opening that is configured move air therein.

19. The laundry treatment apparatus according to claim 1, wherein the actuator is configured to rotate the moving portion by one or more revolutions and in a first direction.

20. A laundry treatment apparatus comprising:
   a tub configured to receive water;
   a drum that is rotatably provided in the tub and that is configured to receive laundry;
   an agitator that is rotatably provided in the drum and that is configured to move the laundry;
   a driver that is coupled to the tub and that is configured to provide power for rotating at least one of the drum or the agitator; and
   a clutch unit that is provided between the driver and the agitator and that is configured to transmit the power from the driver to at least one of the drum or the agitator,
   wherein the clutch unit includes:
      a gear unit configured to rotate based on being engaged with the driver,
      a rotary shaft that is coupled to the gear unit and that is configured to rotate the agitator,
      a housing that is coupled to the drum and that accommodates the gear unit and the rotary shaft,
      a coupler that is configured to reciprocate between the housing and the driver and that is configured to rotate the housing,
      a moving portion that supports the coupler seated thereon to reciprocate the coupler, and
      an actuator configured to reciprocate the moving portion,
   wherein at least a portion of the actuator is disposed in the driver, and
   wherein the actuator is configured to rotate the moving portion by one or more revolutions and in a first direction.

* * * * *